US012725339B2

(12) United States Patent
Liu

(10) Patent No.: US 12,725,339 B2
(45) Date of Patent: Sep. 1, 2026

(54) METHOD AND APPARATUS FOR GENERATING WALK ANIMATION OF VIRTUAL ROLE, DEVICE AND STORAGE MEDIUM

(71) Applicant: TENCENT TECHNOLOGY (SHENZHEN) COMPANY LIMITED, Shenzhen (CN)

(72) Inventor: Shikai Liu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 437 days.

(21) Appl. No.: 18/338,330

(22) Filed: Jun. 20, 2023

(65) Prior Publication Data

US 2023/0334744 A1 Oct. 19, 2023

Related U.S. Application Data

(63) Continuation of application No. PCT/CN2022/127073, filed on Oct. 24, 2022.

(30) Foreign Application Priority Data

Nov. 19, 2021 (CN) ......................... 202111374361.9
Dec. 28, 2021 (CN) ......................... 202111628788.7

(51) Int. Cl.
*G06T 13/40* (2011.01)
*A63F 13/57* (2014.01)

(52) U.S. Cl.
CPC .............. *G06T 13/40* (2013.01); *A63F 13/57* (2014.09)

(58) Field of Classification Search
None
See application file for complete search history.

(56) References Cited

U.S. PATENT DOCUMENTS 10,351,189 B2 * 7/2019 Blankespoor ........ B62D 57/024
2006/0250402 A1 * 11/2006 Perlin ..................... G06T 13/40
345/474

(Continued)

FOREIGN PATENT DOCUMENTS

CN 103514622 A 1/2014
CN 105608309 A 5/2016

(Continued)

OTHER PUBLICATIONS

Sun et al., “Automating Gait Generation” (Year: 2001).*
The World Intellectual Property Organization (WIPO) International Search Report for PCT/CN2022/127073 Jan. 19, 2023 13 Pages (including translation).

(Continued)

*Primary Examiner* — Hilina K Demeter
(74) *Attorney, Agent, or Firm* — Anova Law Group, PLLC

(57) ABSTRACT

A method and apparatus for generating a walk animation of a virtual role includes: predicting touchdown points of a leg of the virtual role in the walk process according to a movement velocity and a movement direction of the virtual role; computing a position of a foot of the leg in a swing phase according to two adjacent touchdown points of the leg; performing, based on the position of the foot of the leg in the swing phase, inverse kinematics computation to obtain positions of bone points of the leg in the swing phase; and performing, based on the positions of the bone points of the leg in the swing phase, gait fusion to generate a walk animation of the virtual role.

19 Claims, 11 Drawing Sheets

(56) References Cited

U.S. PATENT DOCUMENTS

| | | | | |
|---|---|---|---|---|
| 2016/0324445 | A1* | 11/2016 | Kim | A61B 5/6802 |
| 2017/0018110 | A1* | 1/2017 | Raschke | G06F 3/011 |
| 2017/0281085 | A1* | 10/2017 | Lee | A61B 5/1118 |
| 2018/0107175 | A1* | 4/2018 | Ha | G05B 11/01 |
| 2019/0204848 | A1* | 7/2019 | Xiong | G05D 1/0268 |
| 2021/0181765 | A1* | 6/2021 | Bai | G05D 1/0891 |

FOREIGN PATENT DOCUMENTS

| | | | |
|---|---|---|---|
| CN | 110728739 | A | 1/2020 |
| CN | 111311714 | A | 6/2020 |
| CN | 112348931 | A | 2/2021 |
| CN | 113318439 | A | 8/2021 |
| CN | 114283229 | A | 4/2022 |
| WO | 2021045082 | A1 | 3/2021 |

OTHER PUBLICATIONS

Ahmad et al., "Procedural locomotion of multi-legged characters in complex dynamic environments", 11 pages.

Andreas et al., "FABRIK: A fast, iterative solver for the Inverse Kinematics problem". Department of Engineering, University of Cambridge. 2011 18 pages.

Andreas et al., "Extending FABRIK with model constraints", Computer Animation and Virtual Worlds, Comp. Anim. Virtual Worlds 2016; 27:35-57, Feb. 2, 2015 23 pages.

Jeff Lander, "Oh my God, I Inverseted kine!", Game Developer 4 pages.

Jeff Lander, "Making Kine More Flexible", Game Developer 5 pages.

David Rosen, Wolfire Games. Animation BootCamp, An Indie Approach to Procedural Animation. 5 pages.

Clifford Roche, Carlos TorresCros. Fitting the World: A biomechanical approach to foot ik. 5 pages.

* cited by examiner

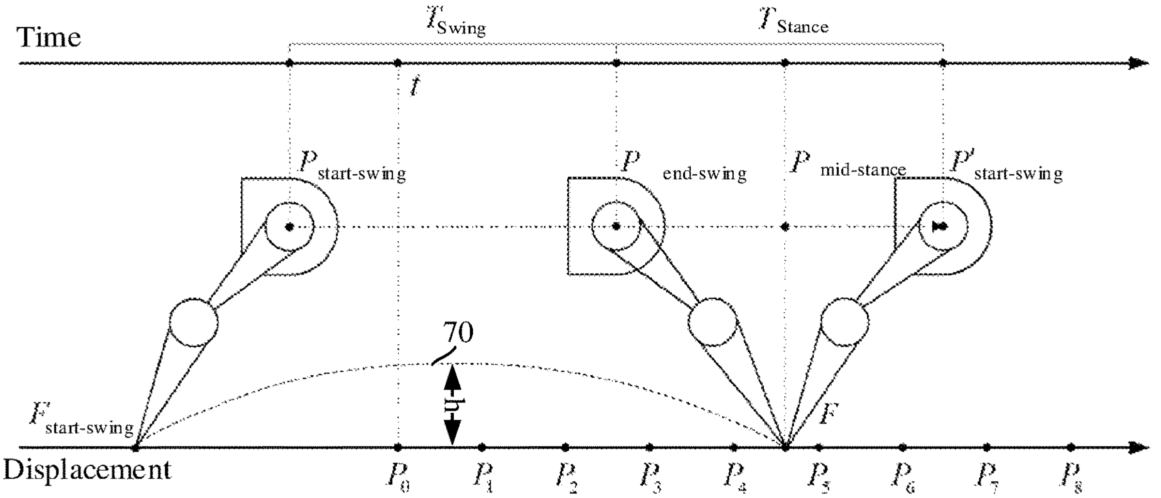
FIG. 7
Gait parameter
Gait period (cycle time)
Foot parameter list
1 — 1..*
Foot parameter
Swing start
Swing period
Swing height
Pace midpoint
FIG. 8
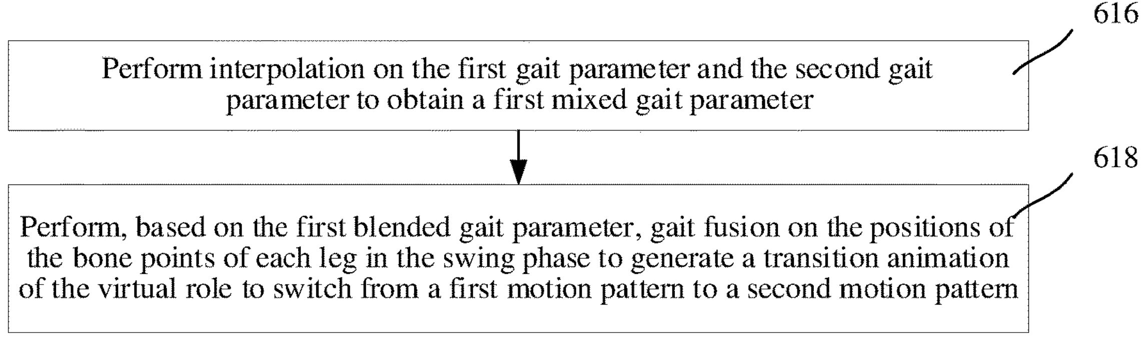
FIG. 9

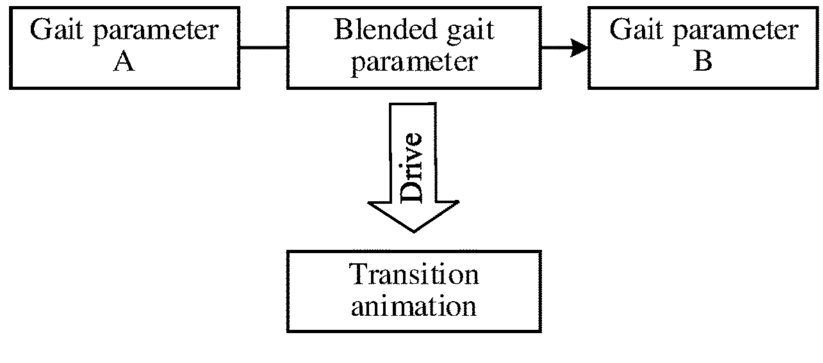
FIG. 10
620
Perform interpolation on a third gait parameter and a fourth gait parameter to obtain a second mixed gait parameter
622
Perform, based on the second mixed gait parameter, gait fusion on positions of bone points of each leg in a swing phase to generate a walk animation of a virtual role in a third movement direction
FIG. 11
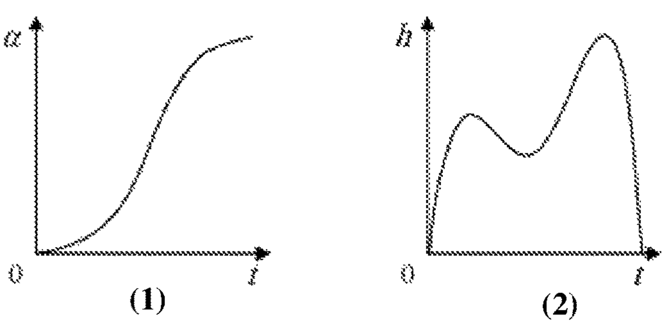
FIG. 12

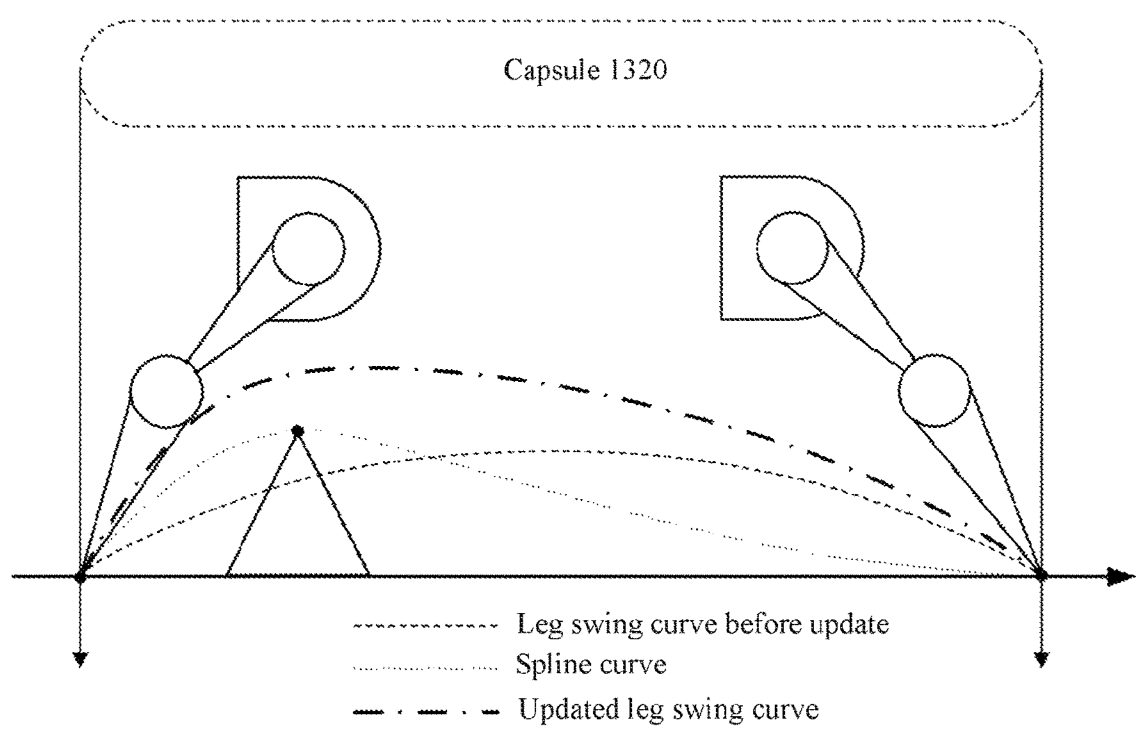
FIG. 13
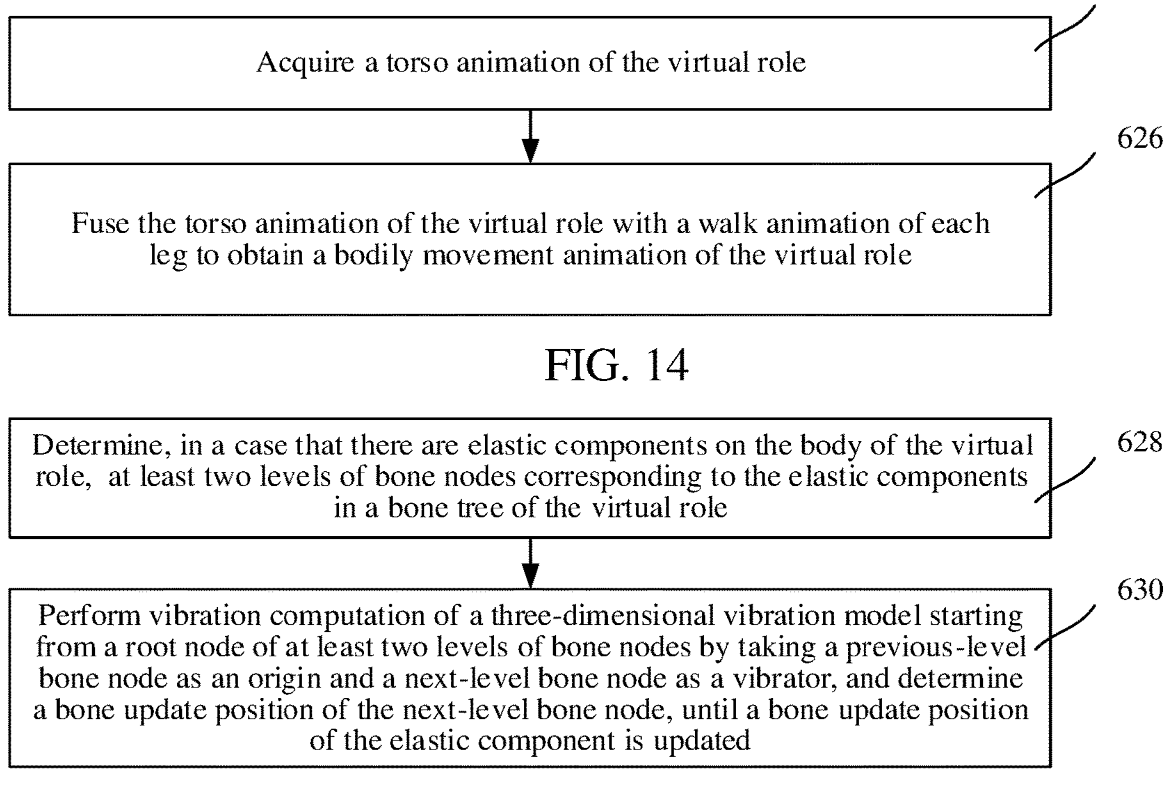
FIG. 14
FIG. 15

METHOD AND APPARATUS FOR GENERATING WALK ANIMATION OF VIRTUAL ROLE, DEVICE AND STORAGE MEDIUM

CROSS-REFERENCES TO RELATED APPLICATIONS

This application is a continuation application of PCT Patent Application No. PCT/CN2022/127073, filed on Oct. 24, 2022, which claims priority to Chinese Patent Application No. 202111374361.9, entitled "METHOD AND APPARATUS FOR GENERATING WALK ANIMATION OF VIRTUAL ROLE, DEVICE AND STORAGE MEDIUM" filed with the China National Intellectual Property Administration on Nov. 19, 2021, and Chinese Patent Application No. 202111628788.7, entitled "METHOD AND APPARATUS FOR GENERATING WALK ANIMATION OF VIRTUAL ROLE, DEVICE AND STORAGE MEDIUM" filed with the China National Intellectual Property Administration on Dec. 28, 2021, the entire contents of both of which are incorporated herein by reference.

FIELD OF THE TECHNOLOGY

The present disclosure relates to the field of animation production technologies, and in particular relates to a method and apparatus for generating a walk animation of a virtual role, a device and a storage medium.

BACKGROUND

Multi-legged robotic virtual roles often appear in realistic combat style of games. A virtual multi-legged robot has the characteristics of extremely strong weight and provides oppressing sensation, like a stably advancing unstoppable mobile fortress.

In the related art, a walk animation of the virtual multi-legged robot is generated by using an animation blending technology. For example, when the virtual multi-legged robot transitions from a walk pose to a stand pose, animation sequences of both the walk pose and the stand pose are played simultaneously during transition, and a play weight is slowly shifted from the walk pose to the stand pose depending on the transition progress, thereby achieving a smooth transition effect.

However, since the movement velocity and the movement direction of the virtual role constantly vary, in some cases, for example the position of a stance leg of the virtual multi-legged robot in two animation sequences can be far apart, then a user would obviously see that the stance leg "glides" on the ground for a distance, and this strangeness that does not occur in the real world is the phenomenon of "slide".

SUMMARY

According to embodiments of the present disclosure, a method and apparatus for generating a walk animation of a virtual role, a device and a storage medium are provided.

According to one aspect of the present disclosure, a method for generating a walk animation of a virtual role is provided, the method being performed by a computer device, a walk process of a leg of the virtual role including alternating swing phases and stance phases, and the method including: predicting touchdown points of a leg of the virtual role in the walk process according to a movement velocity and a movement direction of the virtual role; computing a position of a foot of the leg in a swing phase according to two adjacent touchdown points of the leg; performing, based on the position of the foot of the leg in the swing phase, inverse kinematics computation to obtain positions of bone points of the leg in the swing phase; and performing, based on the positions of the bone points of the leg in the swing phase, gait fusion to generate a walk animation of the virtual role.

According to another aspect of the present disclosure, an apparatus for generating a walk animation of a virtual role is provided, where the leg of the virtual role alternately performs a swing phase and a stance phase in a walk process, the apparatus including: a prediction module, configured to predict touchdown points of the leg of the virtual role in the walk process according to the movement velocity and the movement direction of the virtual role; a computation module, configured to compute the position of the foot of the leg in the swing phase according to two adjacent touchdown points of the leg; an IK module, configured to perform, based on the position of the foot of the leg in the swing phase, inverse kinematics computation to obtain positions of bone points of the leg in the swing phase; and a fusion module, configured to perform, based on the positions of the bone points of the leg in the swing phase, gait fusion to generate the walk animation of the virtual role.

According to one aspect of the present disclosure, a computer device is provided, the computer device including: one or more processors and a memory, the memory storing a computer-readable instruction, the computer-readable instruction being loaded and executed by the one or more processors to implement the method for generating the walk animation of the virtual role as mentioned above.

According to another aspect, a non-transitory computer-readable storage medium is provided, the storage medium storing a computer instruction, the computer instruction being loaded and executed by the one or more processors to implement the method for generating the walk animation of the virtual role as mentioned above.

Details of one or more embodiments of the present disclosure are provided in the accompanying drawings and descriptions below. Other features, objectives and advantages of the present disclosure become apparent from DESCRIPTION, DRAWINGS and CLAIMS.

BRIEF DESCRIPTION OF THE DRAWINGS

To describe the technical solutions of the embodiments of the present disclosure more clearly, a brief introduction will be given to the accompanying drawings required in the description of the embodiments. Apparently, the accompanying drawings in the following description show only some embodiments of the present disclosure, and a person of ordinary skill in the art may still obtain other drawings from these accompanying drawings without creative efforts.

FIG. 2 shows an analytical schematic diagram of a walk motion of a humanoid virtual role provided by an embodiment.

FIG. 3 shows a flowchart of a method for generating a walk animation of a virtual role provided by an embodiment.

FIG. 7 shows a prediction schematic diagram of touchdown points provided by another embodiment.

FIG. 8 shows a data structure diagram of gait parameters provided by an embodiment.

FIG. 9 shows a schematic diagram of a method for generating a walk animation of a virtual role provided by an embodiment.

FIG. 10 shows a schematic diagram of blending different gait parameters into a transition animation provided by an embodiment.

FIG. 11 shows a schematic diagram of a method for generating a walk animation of a virtual role provided by an embodiment.

FIG. 12 shows a schematic diagram of a leg swing curve with swing optimization provided by an embodiment.

FIG. 13 shows a schematic diagram of a leg swing curve at encountering a small obstacle provided by an embodiment.

FIG. 14 shows a schematic diagram of a method for generating a walk animation of a virtual role provided by an embodiment.

FIG. 15 shows a schematic diagram of a method for generating a walk animation of a virtual role provided by an embodiment.

DESCRIPTION OF EMBODIMENTS

Figure 1:
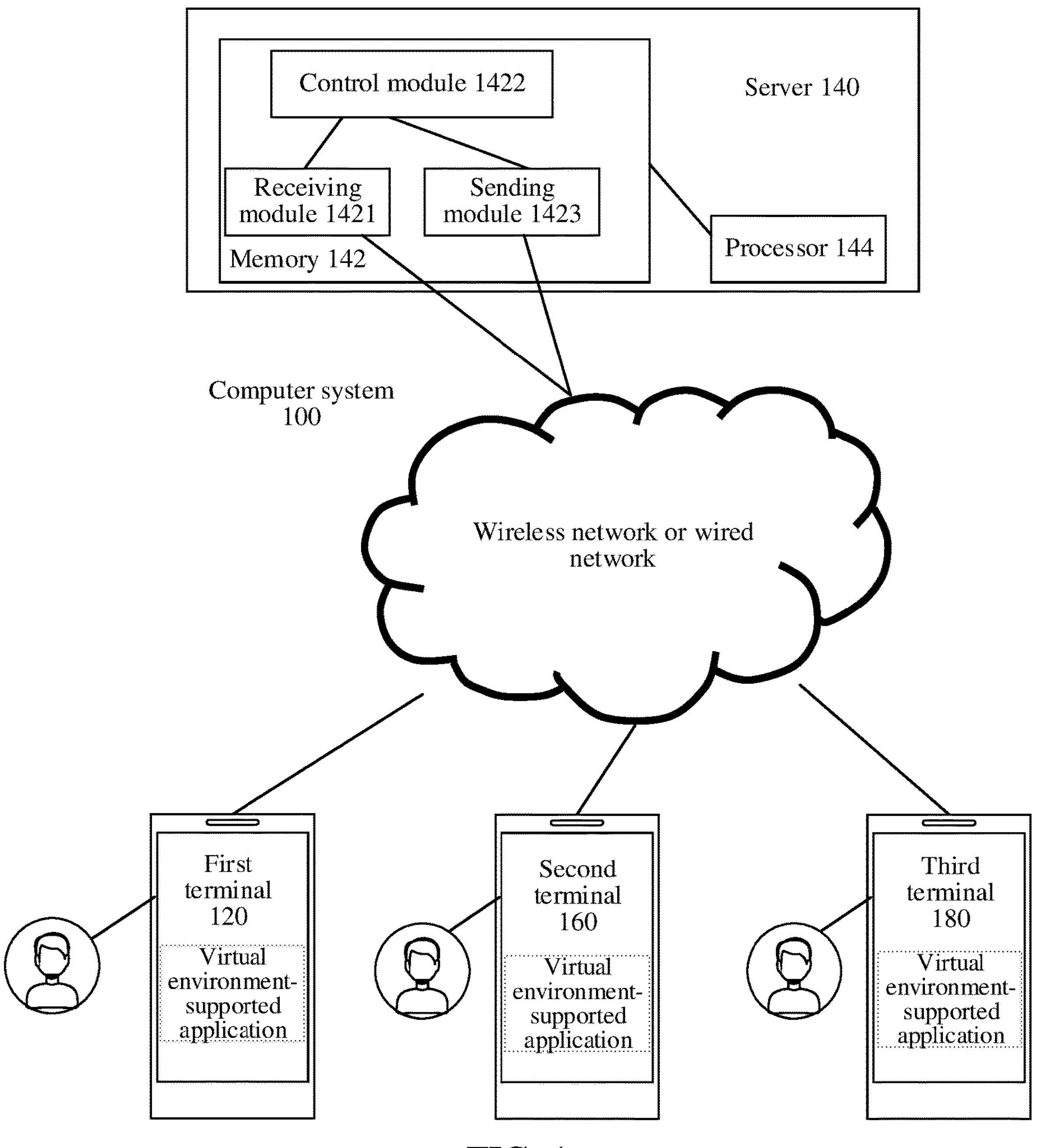
FIG. 1 shows a structural block diagram of a computer system provided by an embodiment.

Exemplary embodiments are described in detail herein, and examples of the exemplary embodiments are shown in the accompanying drawings. When the following description involves the accompanying drawings, unless otherwise indicated, the same numerals in different accompanying drawings represent the same or similar elements. The implementations described in the following exemplary embodiments do not represent all implementations consistent with the present disclosure. On the contrary, the implementations are merely examples of apparatuses and methods that are described in detail in the appended claims and that are consistent with some aspects of the present disclosure. "Several" mentioned herein refers to one or more, and "multiple" refers to two or more.

Firstly, a brief introduction will be given to the terms involved in the embodiments of the present disclosure:

Virtual environment: a virtual environment displayed (or provided) when an application runs on a terminal. The virtual environment may be a simulation environment of the real world, a semi-simulation and a semi-fictional environment, or a purely fictional environment. The virtual environment may be any of a two-dimensional virtual environment, a 2.5-dimensional virtual environment and a three-dimensional virtual environment, which will not be limited by the present disclosure. The following embodiments are illustrated with the virtual environment being the three-dimensional virtual environment.

In some embodiments, the virtual environment can provide a combat environment for a virtual role. Exemplarily, in a great running dead type of games, at least one virtual role engages in a single game battle in the virtual environment. The virtual role aims to survive in the virtual environment by dodging attacks launched by an enemy unit and dangers present in the virtual environment (such as a poison gas zone, marshland, etc.). When the hit point of the virtual role in the virtual environment is zero, the life of the virtual role in the virtual environment ends, and a virtual role who successfully passes through routes within a level is the winner. Each client can control one or more virtual roles in the virtual environment.

Virtual role: a movable object in the virtual environment. The movable object may be a virtual character, a virtual animal, a cartoon character, a virtual mecha/robot, etc., such as: a character, an animal and a mecha/robot that are displayed in the three-dimensional virtual environment. In some embodiments, the virtual role is a three-dimensional model created based on an animation bone technology. Each virtual role has its own shape and volume in the three-dimensional virtual environment, thereby occupying a portion of the space in the three-dimensional virtual environment. In some embodiments, the virtual role is a humanoid virtual role with 2 legs. In other embodiments, the virtual role may be a multi-legged virtual role with more than 2 legs, such as a multi-legged virtual robot.

FIG. 1 shows a structural block diagram of a computer system provided by an exemplary embodiment of the present disclosure. The computer system 100 includes: a first terminal 120, a server 140, a second terminal 160 and a third terminal 180.

The first terminal 120 installs and runs a virtual environment-supported application. The application may be any of a three-dimensional map program, side-scrolling shooting, side-scrolling adventure, side-scrolling clearance, side-scrolling strategy, a virtual reality (VR) application or an augmented reality (AR) program. The first terminal 120 is a terminal used by a first user. The first user controls, by using the first terminal 120, a first virtual role located in the virtual environment to perform an activity. The activity includes but not limited to: at least one of adjust body poses, walk, run, jump, ride, drive, aim, pick up, use throwing props and attack other virtual roles. Exemplarily, the first virtual role is a first virtual character, such as a simulation character object or a cartoon character object. Exemplarily, the first user can control, by UI controls in a virtual environment frame, the first virtual role to perform the activity, or the first user can control, by operating an input controlling device connected with the first terminal 120, the first virtual role to perform the activity.

The first terminal 120 is connected with the server 140 via a wireless network or wired network.

The server 140 includes at least one of a server, multiple servers, a cloud computing platform and a virtualization center. Exemplarily, the server 140 includes a processor 144 and a memory 142, where the processor 144 may be one or more. The memory 142 further includes a receiving module 1421, a control module 1422 and a sending module 1423, where the receiving module 1421 is configured to receive a request sent by a client, such as a request of detecting the position of an enemy virtual role; the control module 1422 is configured to control rendering of the virtual environment frame; and the sending module 1423 is configured to send a response to the client, such as send the position of a third virtual role to the client. The server 140 is configured to provide background services for an application that supports the three-dimensional virtual environment. In some embodiments, the server 140 undertakes primary computation, while the first terminal 120, the second terminal 160, and the third terminal 180 undertake secondary computation; alternatively, the server 140 undertakes the secondary computation, while the first terminal 120, the second terminal 160, and the third terminal 180 undertake the primary computation; alternatively, the server 140, the first terminal 120, the second terminal 160 and the third terminal 180 uses a distributed computing architecture for cooperative computing.

The second terminal 160 installs and runs a virtual environment-supported application. The second terminal 160 is a terminal used by a second user. The second user controls, by using the second terminal 160, a second virtual role located in the virtual environment to perform an activity. The third terminal 180 installs and runs a virtual environment-supported application. The third terminal 180 is a terminal used by a third user. The third user controls, by using the third terminal 180, a third virtual role located in the virtual environment to perform an activity In some embodiments, the first virtual role, the second virtual role and the third virtual role are located in the same virtual environment. The first virtual role and the second virtual role belong to different camps, while the second virtual role and the third virtual role belong to the same camp. For example, the first virtual role belongs to camp A, while the second virtual role and the third virtual role belong to camp B.

In some embodiments, applications installed on the first terminal 120, the second terminal 160 and the third terminal 180 are the same, or applications installed on the three terminals are the same type of applications on different operating system platforms (Android or IOS). The first terminal 120 may refer to one of multiple terminals in a general sense, the second terminal 160 may refer to one of the multiple terminals in a general sense, and the third terminal 180 may refer to one of the multiple terminals in a general sense. This embodiment is illustrated with the first terminal 120, the second terminal 160 and the third terminal 180. The device types of the first terminal 120, the second terminal 160 and the third terminal 180 are the same or different. The device type includes: at least one of a smartphone, a smartwatch, a smart television, a tablet, an e-book reader, an MP3 player, an MP4 player, a laptop and a desktop computer. The following embodiments are illustrated with the terminal including the smartphone.

Those skilled in the art may be aware that the number of the above-mentioned terminals may be more or less. For example, the above terminals may have a number of only one, or dozens or hundreds, or more. The embodiments of the present disclosure do not limit the number of the terminals and the device types.

The walk animation is an animation used for simulating the walk motion of n legs of a virtual role, where n is an integer greater than 1. Simply put, the walk motion is a continuous cycle of the alternating motion of each leg. FIG. 2 shows a schematic diagram of a humanoid virtual role in a walk cycle. The motion of the leg may be divided into a stance phase and a swing phase. In the stance phase, feet will cling to the ground, and the body is pushed to move forward by means of a static friction force between the feet and the ground; while in the swing phase, the feet will move toward a direction the body is about to move forward, searching for a suitable touchdown point to prepare for the next stance. In one walk cycle, each leg will undergo these two phases once, and in order to maintain the body balance, the stance phases of all legs will be staggered. In the present disclosure, this cooperation between these legs is called gait, and the time required to complete this cycle is a gait period.

The present disclosure proposes a technical solution for generating a walk animation of a virtual role by programming, which can generate a walk animation that is adapted to a current motion state of the virtual role under different motion states, in order to eliminate the "slide" problem in a related animation production method.

FIG. 3 shows a flowchart of a method for generating a walk animation of a virtual role provided by a schematic embodiment of the present disclosure. The method for generating the walk animation of the virtual role can be performed by the computer device, such as at least one of a terminal, a server and other compute devices. This embodiment is illustrated with the method being performed by the terminal. The method includes:

Step 302: Predict touchdown points of a leg of a virtual role according to the movement velocity and the movement direction of the virtual role. In some embodiments, when the virtual role has multiple leges, steps 302-308 may be performed for each leg of the virtual role.

The movement velocity of the virtual role varies in different motion states. The motion states include: at least one of walk, run, crawl forward, etc. The movement direction of the virtual role can be manually controlled by the user (player). There are also differences in walk animations of the virtual roles at different movement velocities and movement directions.

In real life, when walking, humans push their bodies to move forward by stepping on the ground with both feet, that is, "walk" leads to "move". However, contrarily in the virtual world, the movement of the virtual role is usually directly controlled by a movement system. In order to make the virtual role appear to "walk" rather than "glide", the walk animation is added to the virtual role, that is, "move" leads to "walk". When produced, a walk animation will be usually tailored based on the movement velocity of the virtual role in the game. In this way, the walk animation of the virtual role conforms to the walk style of humans in real life. "Footstep" matching "move" is the basic goal of a motion animation.

Since the position of the foot in the stance phase does not change, computation of foot motion mainly focuses on the swing phase. The swing phase is essentially a motion process of the foot from a lift-up point (start-swing) to a touchdown point (end-swing). As long as positions of the lift-up point and the touchdown point are known, the position of the foot in the swing process can be continuously updated by interpolation.

The terminal predicts multiple touchdown points or the touchdown point sequence of each leg of the virtual role according to the movement velocity and the movement direction of the virtual role. For two adjacent touchdown points, a previous touchdown point is a corresponding lift-up point of a next touchdown point.

Assuming that the virtual role has n legs and n is an integer greater than 1, the touchdown point sequence for each leg of the virtual role is predicted. The swing phases of at least two legs are alternating. For example, the swing phases of both legs of the humanoid virtual role are alternating. For another example, in a crab robot with 8 legs, the swing phases of odd legs and even legs are alternating.

Step 304: Compute the position of the foot of each leg in a swing phase according to two adjacent touchdown points of the leg.

For one swing phase, the lift-up points and the touchdown points of the feet have been determined in response to that two adjacent touchdown points of each leg are determined. In response to that the lift-up point and touchdown point in the swing phase are known, the position of the foot of each leg in the swing phase can be computed based on a leg swing curve.

Step 306: Perform, based on the position of the foot of the leg in the swing phase, inverse kinematics computation to obtain positions of bone points of the leg in the swing phase.

Figure 4:
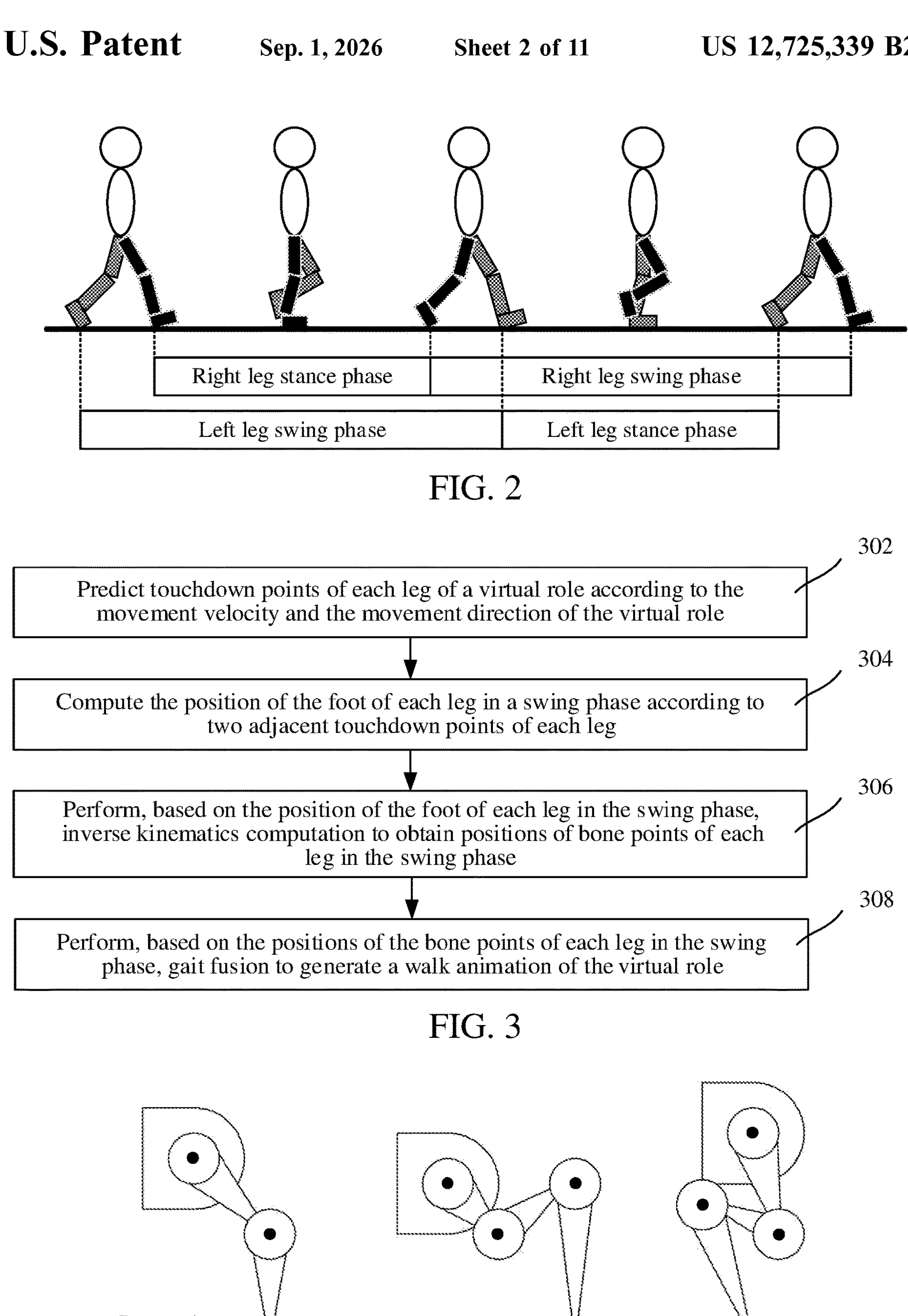
FIG. 4 shows a schematic diagram of bone points on different forms of robot legs provided by an embodiment.

There are multiple bone points on each leg of the virtual role. The bone point is usually located at the joint of a leg bone. As shown in FIG. 4, in various leg structures, each leg may have 3 to 4 bone points. Among the rest, a leg bone close to a torso is a parent bone, and a leg bone close to the foot is a children bone.

In forward kinematics (FK), the orientation of the children bone is obtained by the relative transformation of the orientation of the parent bone and the children bone, that is, the position of a thigh is determined first, and then positions of a shank and the foot are determined based on the motion of the thigh. However, in inverse kinematics (IK), the orientation of the children bone is determined first, and the orientation of an n-level parent bone on its inheritance chain is derived in reverse, that is, the position of the foot is determined first, and then the positions of the shank and the thigh are derived in reverse.

Step 308: Perform, based on the positions of the bone points of the leg in the swing phase, gait fusion to generate a walk animation of the virtual role.

The swing phases of at least two of the n legs of the virtual role are alternating. Assuming the gait period=the duration of the swing phase+the duration of the stance phase, the gait progress of each leg may be different.

Figure 5:
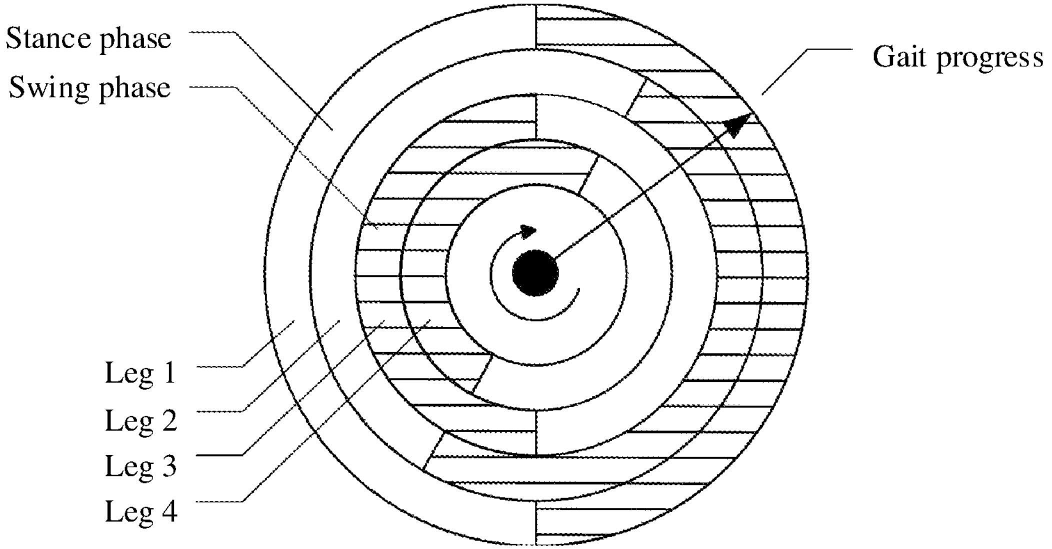
FIG. 5 shows a schematic diagram of the gait progress of different legs at gait fusion provided by an embodiment.

After the position of the bone point of each leg in the swing phase is worked out, it is necessary to perform gait fusion on the gait progress of each leg by gait management, so that the virtual role can reasonably call each leg for the walk motion. As shown in FIG. 5, the gait cycle of four legs is regarded as a circular progress bar, and they will respectively arrange sections occupied by the stance phase and the swing phase on the progress bar. The whole gait progress is like a pointer, and the pointer advances the update of the gait progress of each leg at a uniform angular velocity.

Schematically, the gait management process shown in FIG. 5 can be represented by a set of gait parameters. The gait parameters include: at least one of the gait period, starting time point of each leg, a swing duration, a pace midpoint (mid-stance) and swing height. The starting time point is the lift-up time in the swing phase; the swing duration is the duration of one swing phase; the pace midpoint or the mid-stance refers to a midpoint position in one stance phase; and the swing height refers to the highest swing height of the foot in a single swing phase. Each of the gait parameters can be custom-set or custom-adjusted, so that an action animation of the virtual role conforms to the design expectations.

Based on gait management, programmed fusion is performed on the positions of the bone points of each leg in the swing phase to generate a walk animation of the n legs.

In summary, in the method provided by this embodiment, the walk animation of the n legs can be generated based on a programmed form by firstly computing motion of the foot of each leg according to the movement velocity and the movement direction of the virtual role, and then performing gait fusion of each leg. Regardless of the movement velocity and the movement direction of the virtual role, a corresponding walk animation can be adaptively generated, without the slide problem caused by animation blending in related art.

Moreover, the method provided by this embodiment can be directly applied to virtual roles of different styles or forms. In an animation generation process with different virtual roles, there is no longer a need to write corresponding motion animation logics for the motion of different virtual roles, so that the efficiency of animation generation can be effectively improved.

Figure 6:
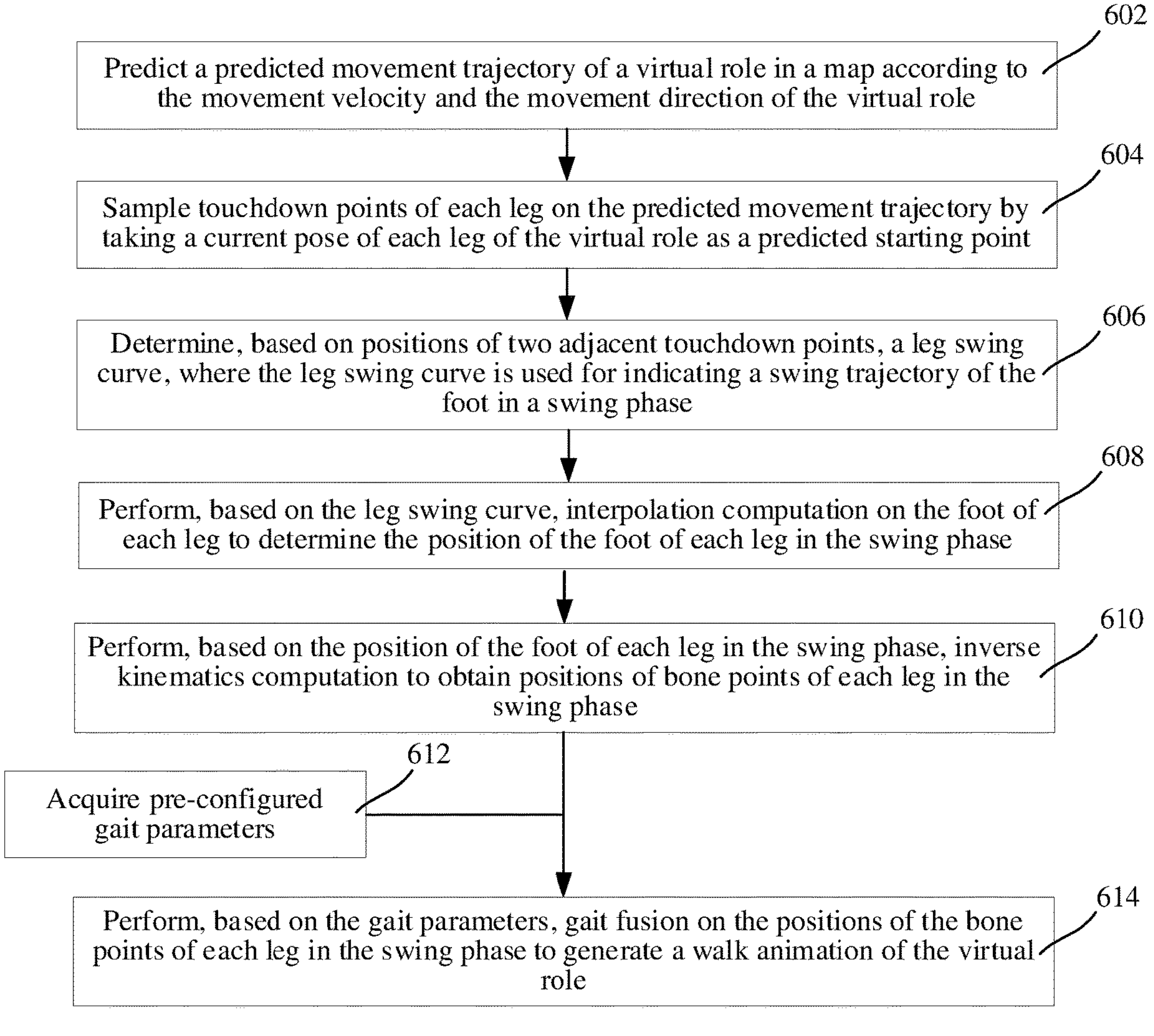
FIG. 6 shows a schematic diagram of a method for generating a walk animation of a virtual role provided by an embodiment.

FIG. 6 shows a flowchart of a method for generating a walk animation of a virtual role provided by a schematic embodiment of the present disclosure. This embodiment is illustrated with the method being performed by the terminal. The method includes:

Step 602: Predict a predicted movement trajectory of a virtual role in a map according to the movement velocity and the movement direction of the virtual role;

When the virtual role is in a steady gait, the gait period is equal to the sum of the duration of the stance phase and the duration of the swing phase of any leg, and the proportion of time that the stance phase and the swing phase occupy throughout the gait period is also a constant value k. Among the rest, k configuration by oneself can be performed as required.

$$T_{stance}=T\cdot k$$

$$T_{swing}=T\cdot(1-k)$$

Where $T_{stance}$ is the duration of the stance phase in one gait period, and $T_{swing}$ is the duration of the swing phase in one gait period. Poses presented by the virtual role at the starting point and the ending point of one gait cycle are to be the same, and therefore, the displacement $S_{swing}$ of the foot is equivalent to the displacement $S_{pawn}$ of the virtual role itself. Since the absolute position of the foot does not change in the stance phase, all displacements of the foot are generated in the swing phase.

$$S_{stance}=0$$

$$S_{swing}=S_{pawn}$$

Since the essence of the swing phase is the motion process of the foot from the lift-up point to the touchdown point, as long as positions of the lift-up point and the touchdown point can be known, the position of the foot in the swing process can be continuously updated by interpolation (periodic interpolation by frame interval duration per frame). The lift-up point is known, and the main problem is how to predict the position of the lift-up point.

The displacement of the virtual role can be directly estimated by the movement velocity of the virtual role, or can be predicted more accurately by using a mobile system (such as Movement Component in Unreal Engine 4) provided by a client (such as game) itself. Schematically, simulation movement is performed on the virtual role several times at a current movement velocity and movement direction in a small time step size (such as 0.2 seconds), thereby obtaining a predicted movement trajectory $T_{raj}$. Schematically, multiple sampling points on the predicted movement trajectory are shown by $P_0$-$P_8$ in FIG. 7.

$$Traj=\{P_0,P_1,P_2 \ldots P_n\}$$

Where n is an integer. $P_i$ is an $i^{th}$ sampling point on the predicted movement trajectory. A time step size between two adjacent sampling points is a preset value.

Step 604: Sample touchdown points of each leg on the predicted movement trajectory by taking a current pose of each leg of the virtual role as a predicted starting point.

Referring to FIG. 7, it is assumed that the virtual role includes n legs, with a gait period equal to the duration $T_{swing}$ of the swing phase and the duration $T_{stance}$ of the stance phase. This step may include the following substeps:

Computing, in response to that a current pose of an $i^{th}$ leg of the virtual role is in a $t^{th}$ second state in the swing phase, the sum of the remaining duration of the swing phase and half of a duration of the stance phase as predicted duration.

The remaining duration of the swing phase is $(T_{swing}-t)$, and the duration of the half the stance phase is $½ *T_{stance}$, then the predicted duration $t'=(T_{swing}-t)+½*T_{stance}$.

Determining a position of moving forward for a predicted length along the predicted movement trajectory as a body position of the virtual role at the time of touchdown by taking the position of the current pose of the virtual role on the predicted movement trajectory as a starting point, where the predicted length is equal to a product of the predicted duration and the movement velocity.

$$t' = T_{swing} + \frac{1}{2}T_{stance} - t$$

$$P_{mid\text{-}stance} = Traj(t')$$

$$F_{end\text{-}swing} = P_{mid\text{-}stance} + F_{local}$$

Calculating, based on the body position of the virtual role at the time of touchdown and a relative position relationship, touchdown points of the $i^{th}$ leg of the virtual role on the predicted movement trajectory.

Where i is a positive integer less than or equal to n, and the relative position relationship is a pre-configured relative position between the body and the $i^{th}$ leg of the virtual role. In the above formula, P represents the position of the torso of the virtual role, and F represents the position of the foot of the virtual role.

That is, assuming that the $i^{th}$ leg for the virtual role is in $t^{th}$ second after the start of the swing phase, if the remaining swing duration $(T_{swing}-t)$ is inputted into the predicted movement trajectory for sampling, the position and orientation information of the virtual role when the foot of the $i^{th}$ leg touches down can be obtained. As long as the relative position of the foot and the torso of the virtual role is known when the foot touches down, the touchdown points can be calculated. However, the relative position at this time is not acquired in this embodiment, but there is a piece of similar information that can be acquired, which is the pace midpoint $P_{mid\text{-}stance}$ of this leg. The pace midpoint or mid-stance refers to the midpoint of a line connecting the lift-up point (start-swing) and the touchdown point (end-swing). When the torso of the virtual role is taken as a reference system, it can be seen that the entire gait cycle is a cycle that the foot does forward and backward motion around this pace midpoint. From an animation perspective, the relative position of the pace midpoint and the torso of the virtual role directly will influence the pose presentation of the virtual role during walk. Therefore, in this embodiment, the relative position of the pace midpoint and the torso of the virtual role is also taken as a configuration parameter $F_{local}$, which is pre-configured or adjusted by an animator.

Therefore, in this embodiment, the sampling time point of the touchdown point can be delayed by half the duration of the stance phase. At this delayed sampling time point, the foot is exactly at the position of the pace midpoint. In this embodiment, after the torso information of the virtual role at this time is sampled, the position of the foot can be calculated. Since the absolute position of the feet throughout the stance phase does not change, the worked out position of the foot at this time is a desired predicted touchdown point.

Step 606: Determine, based on positions of two adjacent touchdown points, a leg swing curve;

The leg swing curve indicates a swing trajectory of the foot in a swing phase. In general, the leg swing curve is represented by a parabola 70, as shown in FIG. 7. The two endpoints of the parabola are the lift-up (start-swing) point and the touchdown (end-swing) point, respectively. The height h of the parabola is the maximum swing height of the foot in the swing phase. The maximum swing height can also be pre-configured or adjusted by the animator.

Step 608: Perform, based on the leg swing curve, interpolation computation on the foot of each leg to determine the position of the foot of each leg in the swing phase;

$$F_t = F_{start\text{-}swing} + \frac{t}{T_{swing}}(F_{end\text{-}swing} - F_{start\text{-}swing})$$

Where Ft is the position of the foot of each leg on the leg swing curve at the $t^{th}$ second of the swing phase. Schematically, the step size of time t can be determined by the frame interval of displayed frames, for example, 60 frames per second, then the step size of t is 1/60 second.

Step 610: Perform, based on the position of the foot of each leg in the swing phase, inverse kinematics computation to obtain positions of bone points of each leg in the swing phase.

In response to that the virtual role is a virtual multi-legged robot, various leg structures may be designed for the virtual multi-legged robot. The two-step inverse kinematics (IK) commonly used for human roles is not suitable for the virtual multi-legged robot. For the virtual multi-legged robot, cyclic coordinate descent inverse kinematics (CCDIK) or forward and backward reaching inverse kinematics (FABRIK) algorithms can be employed for computation. That is, CCDIK computation is performed according to the position of the foot of each leg in the swing phase to obtain the positions of the bone points of each leg in the swing phase; alternatively, FABRIK computation is performed according to the position of the foot of each leg in the swing phase to obtain the positions of the bone points of each leg in the swing phase. Both the CCDIK algorithm and the FABRIK algorithm have at least the following advantages:

Advantage 1: any number of joints are supported, thereby providing much room for leg structure design.

Advantage 2: angle limitations for joint rotation are supported, and thus, a specific mechanical joint structure of the robot can be implemented.

Advantage 3: the performance is good, and the needs of a real-time operation of games can be met.

After experimental comparison, in response to that the virtual role is the virtual multi-legged robot, FABRIK performs better than CCDIK in terms of a hoof-like leg structure. Therefore, for a virtual multi-legged robot with the hoof-like leg structure, the positions of the bone points of each leg of the virtual multi-legged robot in the swing phase can be computed by using the FABRIK algorithm.

Step 612: Acquire pre-configured gait parameters;

Where the gait parameter are a set of parameters used in gait fusion. For the same virtual role, there is one or more sets of gait parameters, and the number of sets of the gait parameters can be determined according to the number of motion states or movement directions of the virtual role.

Schematically, different sets of gait parameters correspond to different motion states. For example, a sneak state corresponds to the first set of gait parameters, a walk state corresponds to the second set of gait parameters, and a run state corresponds to the third set of gait parameters.

Schematically, different sets of gait parameters correspond to different movement directions. For example, move northward corresponds to the first set of gait parameters, move southward corresponds to the second set of gait parameters, move eastward corresponds to the third set of gait parameters, and move westward corresponds to the fourth set of gait parameters.

In this embodiment, it is illustrated with there being a set of gait parameters. As shown in FIG. 8, the gait parameters include: a gait period and a foot parameter list. In some embodiments, the foot parameter list includes: at least one of swing start, the swing duration, the swing height and the pace midpoint (e.g., pivot location). Where the swing start is the starting time point of the swing phase, i.e., the lift-up time; the swing duration is the duration of one swing phase; the swing height refers to the highest swing height of the foot in a single swing phase; and the pace midpoint refers to a midpoint position in one stance phase.

Step 614: Perform, based on the gait parameters, gait fusion on the positions of the bone points of each leg in the swing phase to generate a walk animation of the virtual role.

The swing phases of at least two of the n legs of the virtual role are alternating. Assuming the gait period=the duration of the swing phase+the duration of the stance phase, the gait progress of each leg may be different.

After the position of the bone point of each leg in the swing phase is worked out, it is necessary to perform gait fusion on the gait progress of each leg by gait management, so that the virtual role can reasonably call each leg for the walk motion. As shown in FIG. 5, the gait cycle of four legs is regarded as a circular progress bar, and they will respectively arrange sections occupied by the stance phase and the swing phase on the progress bar. The whole gait progress is like a pointer, and the pointer advances the update of the gait progress of each leg at a uniform angular velocity.

Schematically, the gait management process shown in FIG. 5 can be represented by a set of gait parameters. The gait parameters include: at least one of the gait period (total duration thereof), starting time point of each leg, the swing duration, the pace midpoint and the swing height. Among the rest, each of the gait parameters can be custom-set or custom-adjusted, so that the action animation of the virtual role conforms to the design expectations.

Schematically, the gait parameters include: the total duration of the gait period and leg parameters of each leg within the gait period. Within the total duration of the gait period, gait fusion is performed on the positions of the bone points of each leg in the swing phase according to the leg parameters of each leg within the gait period to generate a walk animation of each leg of the virtual role.

The terminal displays the walk animation of each leg of the virtual role. Schematically, in the above computation process, frame-by-frame real-time computation can be performed, or computation results of multiple frames can be pre-computed for caching, and are displayed as cached computation results. This is not limited in this embodiment.

In summary, in the method provided by this embodiment, the walk animation of the n legs can be generated based on a programmed form by firstly computing motion of the foot of each leg according to the movement velocity and the movement direction of the virtual role, and then performing gait fusion of each leg. Regardless of the movement velocity and the movement direction of the virtual role, a corresponding walk animation can be adaptively generated, without the slide problem caused by animation blending in related art. Moreover, in a specific application process, taking a virtual role of a game as an example, the motion of the virtual role can be quickly adjusted through simple parameter configuration, and game play verification can be quickly performed in the game.

Different sets of gait parameters may correspond to different motion states. For example, a sneak state corresponds to the first set of gait parameters, a walk state corresponds to the second set of gait parameters, and a run state corresponds to the third set of gait parameters. In some embodiments, the gait parameters include a first gait parameter (set) in a first motion pattern and a second gait parameter (set) in a second motion pattern. As shown in FIG. 9, the method further includes:

Step 616: Perform interpolation on the first gait parameter and the second gait parameter to obtain a first blended gait parameter.

In some embodiments, interpolation can be implemented based on the animation display frame rate of a virtual environment where the virtual role is located. In some embodiments, the number of interpolations is determined based on the duration and frame rate of a transition animation to switch from the first motion pattern to the second motion pattern, and interpolation processing is performed on a first gait parameter A and a second gait parameter B according to the number of interpolations to obtain the first blended gait parameter.

Assuming that the duration of the transition animation to switch from the first motion pattern to the second motion pattern is n seconds and the number of frames per second is m, the first gait parameter A and the second gait parameter B can be interpolated n*m times to obtain a first blended gait parameter corresponding to each frame.

As shown in FIG. 10, at the time of $i^{th}$ interpolation, first blended gait parameter=$(1-\alpha)$*first gait parameter A+$\alpha$*second gait parameter B, and the value range of $\alpha$ is 0 to 1. $\alpha$ gradually increases from 0 to 1 in n*m times. That is, the first blended gait parameter includes n*m sets of gait parameters, demonstrating a gradual transition process of switching from the first motion pattern to the second motion pattern. Among the rest, different motion states may have different gradual transition degrees. For example, the sneak state corresponds to a first gradual transition degree, the walk state corresponds to a second gradual transition degree, and the run state corresponds to a third gradual transition degree.

Step 618: Perform, based on the first blended gait parameter, gait fusion on the positions of the bone points of each leg in the swing phase to generate a transition animation of the virtual role to switch from the first motion pattern to the second motion pattern.

Before the transition animation, the terminal displays a first walk animation in the first motion pattern. The first walk animation is generated based on the first gait parameter (set). After the transition animation, the terminal displays a second walk animation in the second motion pattern. The second walk animation is generated based on the second gait parameter (set).

In summary, in the method provided by this embodiment, a smooth transition effect between different motion states is achieved through one-dimensional fusion of different sets of gait parameters, so that the virtual role displayed on the terminal exhibits relatively fluent and smooth action changes when switched between different motion states.

Different sets of gait parameters may correspond to different movement directions. For example, move northward corresponds to the first set of gait parameters, move southward corresponds to the second set of gait parameters, move eastward corresponds to the third set of gait parameters, and move westward corresponds to the fourth set of gait parameters. In some embodiments, the gait parameters include a third gait parameter (set) in a first movement direction and a fourth gait parameter (set) in a second movement direction. As shown in FIG. 11, the method further includes:

Step 620: Perform interpolation on the third gait parameter and the fourth gait parameter to obtain a second blended gait parameter.

Assuming that the duration of the transition animation to switch from the first motion pattern to the second motion pattern is n seconds and the number of frames per second is m, two-dimensional interpolation can be performed on a third gait parameter C and a fourth gait parameter D to obtain a second blended gait parameter corresponding to the third movement direction.

Where the third movement direction is a movement direction between the first movement direction and the second movement direction.

Schematically, let the gait parameter of the virtual role while standing still be a fifth gait parameter O. The computation process of the second blended gait parameters is as follows:

$\alpha$=current velocity in the first movement direction/maximum velocity in the first movement direction;

$\beta$=current velocity in the second movement direction/maximum velocity in the second movement direction;

A first intermediate gait parameter $C'=(1-\alpha)*O+\alpha*C$;

A second intermediate gait parameter $D'=(1-\beta)*O+\beta*D$;

Let $\gamma=\beta/(\alpha+\beta)$, the following is obtained finally:

The second blended gait parameter$=(1-\gamma)*C'+\gamma*D'$.

That is, a first weight $\alpha$ is equal to the current velocity in the first movement direction divided by the maximum velocity in the first movement direction, and a second weight $\beta$ is equal to the current velocity in the second movement direction divided by the maximum velocity in the second movement direction. The third gait parameter and the fifth gait parameter are fused by using the first weight to obtain the first intermediate gait parameter. The fourth gait parameter and the fifth gait parameter are fused by using the second weight to obtain the second intermediate gait parameter. A third weight is computed as $\beta/(\alpha+\beta)$. The first intermediate gait parameter and the second intermediate gait parameter are mixed by using the third weight to obtain the second blended gait parameter.

Step 622: Perform, based on the second blended gait parameter, gait fusion on the positions of the bone points of each leg in the swing phase to generate a walk animation of each leg of the virtual role in the third movement direction.

Before the transition animation, the terminal displays a walk animation in the first movement direction. The walk animation in the first movement direction is generated based on the third gait parameter (set). After the transition animation, the terminal displays a walk animation in the second movement direction. The walk animation in the second movement direction is generated based on the fourth gait parameter (set). The third movement direction is located between the first movement direction and the second movement direction, and a smooth transition from the first movement direction to the second movement direction can be implemented based on the third movement direction.

In summary, in the method provided by this embodiment, a smooth transition effect between different motion states is achieved through two-dimensional fusion of different sets of gait parameters, so that the virtual role displayed on the terminal exhibits relatively fluent and smooth action changes when switched between different motion states.

That is, in addition to this one-dimensional blending shown in FIG. 9, the dimension of blending can also be increased like an animation. For example, for the movements of the virtual role in different directions, such as actions of move forward, translate, and move backward, different animation presentations will be generally used in the game. The animator will produce movement animation sequences in 4 or 8 directions, and performs two-dimensional animation blending by an animation blending space. Gait fusing can also follow the same principle, and the animator configures a corresponding gait parameter set for each movement direction. In the operation process of the client, the terminal will perform two-dimensional mixing on the gait parameters according to the movement direction and velocity of the virtual role.

The presentation obtained by directly using the parabola as the leg swing curves is relatively rigid. In order to solve this problem, in some embodiments, the interpolation process has been improved, and a time based curve is introduced for coefficient $\alpha$ of interpolation for control. For example, in the horizontal direction, coefficient $\alpha$ of interpolation can be determined with a curve with acceleration firstly and then deceleration, as shown in the left panel (1) of FIG. 12, that is, the position of the foot in the horizontal direction at the $t^{th}$ second of the leg swing phase, is determined as: $F_{start\text{-}swing}+\alpha*(F_{end\text{-}swing}-F_{start\text{-}swing})$. However, for the swing height in the vertical direction, before touchdown, a re-rising curve can be added, and then rapidly falls, as shown in the right panel (2) of FIG. 12, that is, the position of the foot in the vertical direction is determined, in the $t^{th}$ second of the leg swing phase, as h corresponding to moment t. Taken together, these changes will make the whole leg swing action appear more powerful.

In other some embodiments, the motion data of a foot bone can be recorded in a walk animation produced by the animator in this embodiment to generate a corresponding leg swing curve. The animator can also edit this leg swing curve directly and manually. Some game engines provide curve editors, and thus, the animator can conveniently perform operations thereon.

In other some embodiments, a large robot can step over those relatively short obstacles when traveling, and in order to avoid the three-dimensional model crossover in the leg swing route, an offset is also required for the leg swing curve according to the obstacles. A spline curve is determined in response to that there is an obstacle below the body of the virtual role, based on positions of two adjacent touchdown points and the highest point of the obstacle; and the spline curve is superposed with the leg swing curve to obtain an updated leg swing curve. The spline curve is a smooth curve that passes through a series of given points, and the given points are the highest points of two adjacent touchdown points and the obstacle. As shown in FIG. 13, schematically, a capsule 1320 in the horizontal direction is constructed by using a leg swing distance as a length and the width of the foot as a radius. This capsule 1320 is subjected to collision detection one time from top to bottom to obtain all collision bumps on the ground. Since only those bumps that block the leg swing curve need to be considered, all bumps with a height lower than the leg swing curve can be filtered out first, and a spline curve is generated by using the remaining bumps, and is superposed with the original leg swing curve to obtain a new route, allowing the virtual robot to step over these obstacles.

According to the foregoing embodiment, it is illustrated that the walk animation of the virtual role is generated by a purely procedural way, through which a basically correct presentation effect can be obtained. But as a high-quality game, just being right is far from enough. Gestures and expressions of one virtual role are each a carrier for presenting the personality characteristics of the virtual role. Taking the large multi-legged robot mentioned in the embodiments of the present disclosure as an example, whether it is bulky or flexible is just to be presented through its walk action. Therefore, in the following content, the main consideration of the embodiments of the present disclosure is how to make the animation of the role more vivid. In some embodiments, as shown in FIG. 14, the method further includes:

Step 624: Acquire a torso animation of a virtual role.

If the problem of "slide" is not considered, pre-produced animation sequences are undoubtedly the best means of presentation, and the animators can express all their ideas through animation production tools such as 3ds Max or Maya. Although the animation sequences is generated by a programmatic method in the foregoing embodiments, if the animation sequences can be integrated, the final presentation effect will be undoubtedly greatly improved, so that the animation presented by the walk actions of the virtual role is more vivid.

Therefore, the animator will still produce a motion animation in a certain motion pattern for the virtual role as usual, and the motion animation includes: a torso animation corresponding to a body part and a walk animation corresponding to a leg. In this embodiment, the walk animation in the motion animation produced by the animator is removed, and the remaining animation part is the torso animation of the virtual role.

Step 626: Fuse the torso animation of the virtual role with a walk animation of each leg to obtain a bodily movement animation of the virtual role.

Then, the torso animation produced by the animator is fused with the walk animation computed by a program. Most game engines provide corresponding animation tool chains. Taking Unreal Engine 4 as an example, the computed walk animation can be inputted on the basis of the torso animation in an animation blueprint, and finally the bodily movement animation of the virtual role is outputted.

The torso animation needs to be synchronized with the walk animation in terms of gait period. Since the gait period in the game may dynamically changes, the torso animation will be scaled in real time in this embodiment to ensure that the length of the torso animation is consistent with the gait period, and the gait progress is directly used as the play progress of the torso animation.

Schematically, the animation duration of the torso animation of the virtual role is scaled according to the gait period to obtain a scaled torso animation. Where the animation duration of the scaled torso animation is equal to the duration of the gait period. The scaled torso animation of the virtual role is fused with the walk animation of each leg to obtain the bodily movement animation of the virtual role.

In summary, in the method provided by this embodiment, the torso animation of the virtual role is fused with the walk animation of each leg, so that both the torso and the legs of the virtual role may have an animation effect that fits a walk process, and thus, the overall visual presentation of the motion is more vivid and realistic.

In addition to restoring the effect of the animation sequence as much as possible, physical simulations that reflect inertia can also be added to the virtual role to further enhance the realism of the presentation. For example, in the start and stop or turn process of the virtual role, some parts of the body (such as antennae, cables, weapons, pendants, etc.) will inertially swing with a direction in which the velocity changes. In some embodiments, as shown in FIG. 15, the method further includes:

Step 628: Determine, in response to that there are elastic components on the body of the virtual role, at least two levels of bone nodes corresponding to the elastic components in a bone tree of the virtual role.

The elastic component is a component that can inertially swing with the direction in which the velocity changes, in the start and stop or turn process of the virtual role. The bone tree of the virtual role is established based on the importance of each bone in the virtual role. In one example, among at least two levels of bone nodes, the level of a bone node close to the center of the body is higher than that of a bone node close to the end of the body.

Step 630: Perform vibration computation of a three-dimensional vibration model starting from a root node of at least two levels of bone nodes by taking a previous-level bone node as an origin and a next-level bone node as a vibrator, and determine a bone update position of the next-level bone node, until a bone update position of the elastic component is updated.

Figure 16:
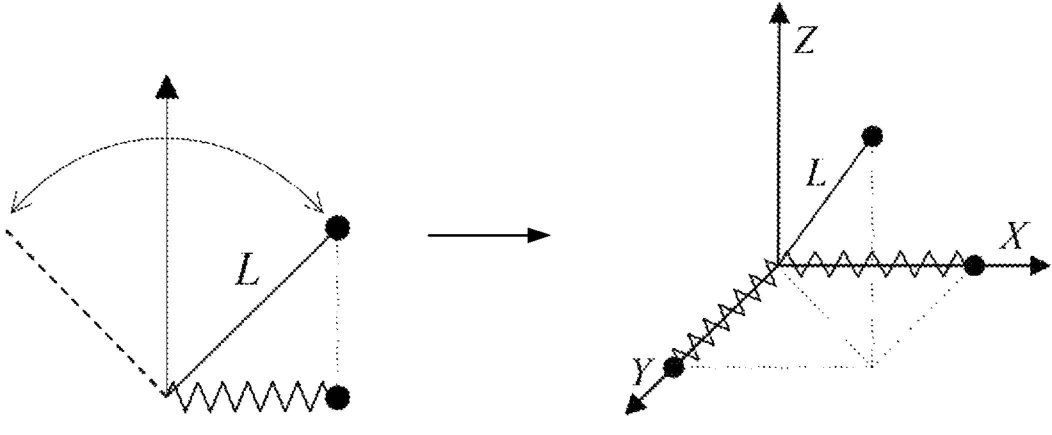
FIG. 16 shows a vibration model diagram of bones of a virtual role at inertial vibration provided by an embodiment.

For a certain bone, when influenced by inertia, the bone will rotate around the parent bone in the direction of inertia, and at the same time, the bone will be pulled back to its original orientation by a return force. As shown in the left panel of FIG. 16, In this vibration model, the top is considered as a final steady orientation to be reached. The distance between a current bone and the parent bone is constant as L. A projection of the current bone in the horizontal direction is regarded as the vibrator. The process that the current bone swings around the parent bone is a process that the vibrator that the projection of the current bone corresponds to vibrates. The mass of the vibrator itself is set to m, the stiffness coefficient of a vibration system is set to k, and the damping coefficient is set to c. Assuming the current position of the vibrator is x, according to the Newton's second law, a force equilibrium equation at this time is as follows:

$$m\ddot{x} + c\dot{x} + kx = 0$$

Where $\dot{x}$ represents the current velocity of the vibrator, and $\ddot{x}$ represents the acceleration of the vibrator. Then parameter $\omega_0$ is defined as the inherent frequency of the system, and $\zeta$ as the damping ratio, which satisfy the following equation:

$$\omega_0 = \sqrt{\frac{k}{m}}\,\zeta = \frac{c}{2\sqrt{km}}$$

The parameters defined are substituted into the previous equation to obtain formula (1):

$$\ddot{x} + 2\zeta\omega_0\dot{x} + \omega_0^2 x = 0$$

The vibrator will swing back and forth, and the amplitude becomes smaller and smaller, and finally approaches to equilibrium infinitely. The initial amplitude is to $\overline{A}$, and over time, the amplitude A(t) satisfies the following equation:

$$A(t) = \overline{A}e^{-\zeta\omega_0 t}$$

The following equation is obtained after the change:

$$t = -\frac{\ln\left(\frac{A(L)}{\overline{A}}\right)}{\zeta\omega_0}$$

$$\alpha = \frac{A(L)}{\overline{A}}$$

is set to represent the ratio of the amplitude relative to the initial amplitude at moment t. It can be defined that the vibrator enters a steady state when this ratio is reduced to a certain extent, and the time point at this moment is denoted as $t_s$. Formula (2) is obtained:

$$t_s = -\frac{\ln(\alpha)}{\zeta\omega_0}$$

The time $t_s$ required for the vibrator to enter the steady state and the damping ratio $\zeta$ are parameters that can be intuitively understood, and they are used as configuration parameters to allow the animator to control the presentation effect of the system. The inherent frequency $\omega_0$ can be derived from the above formula. A relationship between the position, the velocity and the acceleration is obtained after $\zeta$ and $\omega_0$ are substituted into equation (1), and then the vibration process is integrated by a particle motion simulation (Verlet) method with a fixed time step size $\Delta t$ to update the position of the vibrator:

$$\dot{x}(t) = \frac{x(t) - x(t-\Delta t)}{\Delta t}$$

$$x(t+\Delta t) = 2x(t) - x(t-\Delta t) + \ddot{x}(t)\Delta t^2$$

The computation of the vibration model is completed here, and next, three-dimensional processing is performed on this vibration model. For a bone in a three-dimensional space, its projections on the X axis and the Y axis are used as the vibrators, and the vibrators vibrate in their axial directions, respectively, as shown in the right panel of FIG. 16.

The vibration computation is completed on the X axis and the Y axis respectively to obtain x(t+Δt) and y(t+Δt). The vector constituted on the XY plane is: $V_{XY}$=[x(t+Δt), y(t+Δt),0], with a length denoted as $L_{XY}=|V_{XY}|$. From this, it can be obtained that the position vector V where the bone is located is:

$$\vec{V} = \begin{cases} \left[x(t+\Delta t),\ y(t+\Delta t),\ \sqrt{L^2 - L_{XY}^2}\right] & \text{if } L > L_{XY} \\ \vec{V}_{XY}\cdot\frac{L}{L_{XY}} & \text{if } L \le L_{XY} \end{cases}$$

Figure 17:
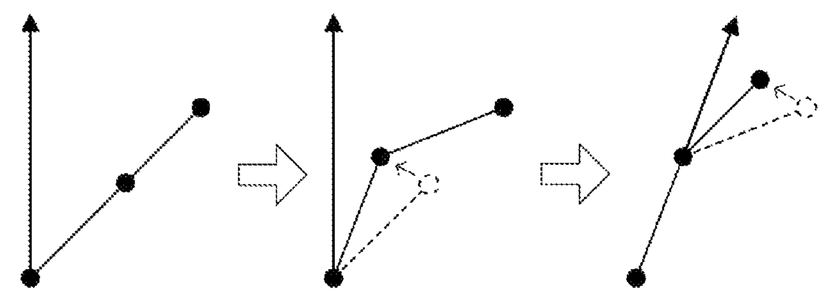
FIG. 17 is a vibration schematic diagram of sequential vibration of multi-level bone nodes provided by an embodiment.

After the above computation step, a three-dimensional vibration model is obtained, and finally, this model is applied to a role skeleton. For each pair of parent and children bones, it can be regarded as a three-dimensional vibration model with the parent bone as an origin and the children bone as a vibrator. After a bone tree that needs to be influenced by inertia is selected from the skeleton, the computation is performed starting from the root nodes to a leaf node step by step. Thus, the bone used as the vibrator becomes the vibration origin of the next-level bone after the position of the bone is updated, and thereby, a knock-on influence is generated on the vibration computation of the next-level bone, and a progressive inertial effect is achieved, as shown in FIG. 17.

By using this simplified vibration model, a more realistic inertial vibration presentation can be obtained in user vision in response to that the computation amount is less.

The foregoing embodiments are all based on the presentation of the walk motion on the flat ground, and there will be various terrains winding down in the virtual world. Next, it is necessary to consider the influence of the terrain on the walk motion.

Figure 18:
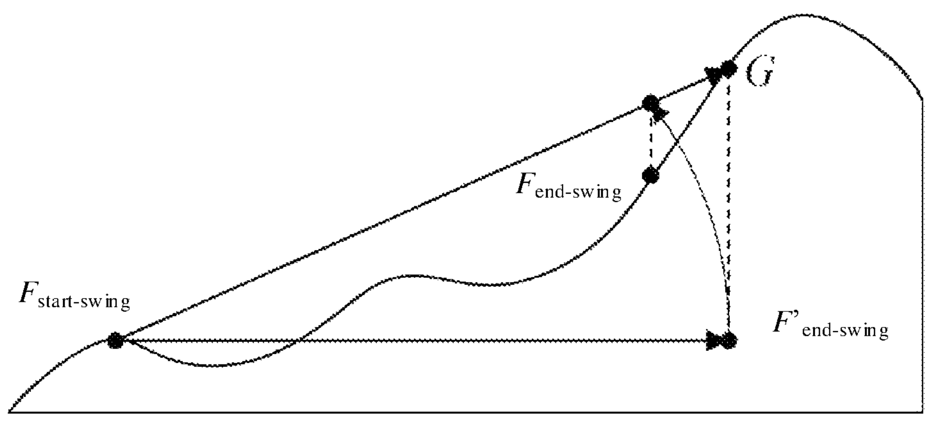
FIG. 18 shows a correction diagram of touchdown points of a virtual role when encountering a non-flat ground provided by an embodiment.

Taking the correction of touchdown points on the non-flat ground as an example, as shown in FIG. 18, firstly, the touchdown points of the foot are allowed to correctly fall on the rugged ground surface. Starting from the previously computed touchdown point $F'_{end\text{-}swing}$ on the flat ground, a ground-hugging point G is found in the vertical direction, and the ground-hugging point G is connected with a lift-up (start-swing) point F. It is assumed that the selected touchdown point on the flat ground is to be the maximum distance that can be reached by leg swing, referred to as the leg swing distance. Therefore, it is necessary to extract a reference point on a new line by using the leg swing distance, and then the reference point is made to hug the ground again to obtain a new touchdown point $F_{end\text{-}swing}$. That is, a first projection point G of the touchdown point $F'_{end\text{-}swing}$ on a non-flat ground in the vertical direction is computed in response to that the ground where the touchdown point $F'_{end\text{-}swing}$ is the non-flat ground; a reference point is extracted based on the leg swing distance, from a line between the touchdown point $F'_{end\text{-}swing}$ and the first projection point G; and a second projection point of the reference point on the non-flat ground in the vertical direction is used as an updated touchdown point $F_{end\text{-}swing}$. By using this touchdown point correction technology, the touchdown point of the foot can correctly fall on the rugged ground surface.

Figure 19:
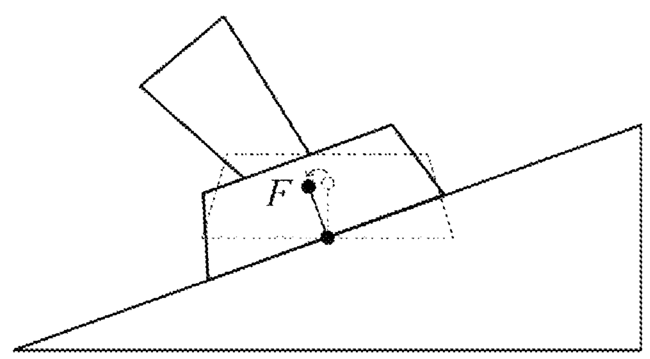
FIG. 19 shows a correction diagram of the body of a virtual role when encountering a non-flat ground provided by an embodiment.

In addition, as shown in FIG. 19, it is also necessary to make a rotation of the foot according to the normal direction of the ground where a current touchdown point is located. Since the foot has a certain thickness, it is necessary to pull the position of a foot bone F to offset together. When the touchdown point position is applied to an animation, this offset cannot be omitted. That is, according to the normal direction of the ground where the updated touchdown point (i.e. the current touchdown point) is located, a pose of the foot at the time of touchdown is deflected so that the sole plane of the foot is perpendicular to the normal direction of the ground where the current touchdown point is located.

For a virtual role with numerous legs, if there is a certain distance between the stance point of each leg on the torso (i.e., the root of the leg), it is necessary to consider the body lean caused by each leg standing at different heights. A stance vector of each leg of the virtual role is computed by the terminal, where the stance vector indicates the inclination of a touchdown point of a current leg relative to the torso of the virtual role; a pose angle of the torso of the virtual role is computed based on the stance vector of each leg; and lean compensation is performed, based on the pose angle, on the torso of the virtual role. Where the pose angle includes a yaw angle, a pitch angle and a roll angle.

Figure 20:
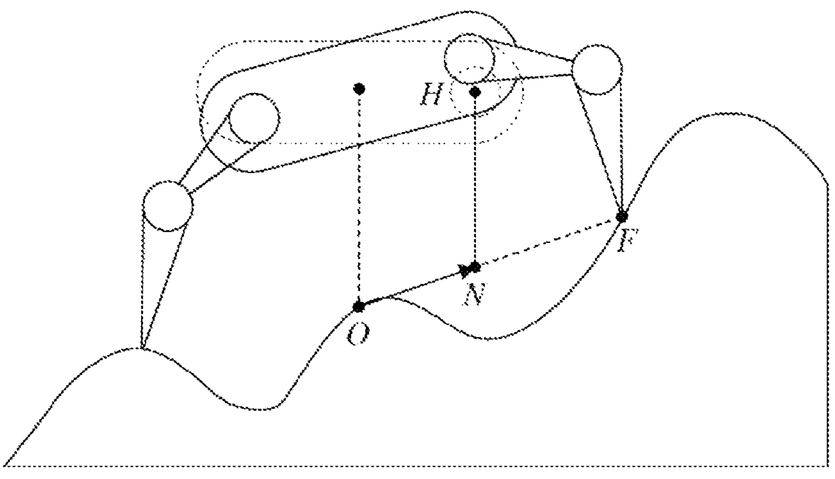
FIG. 20 shows a correction diagram of feet of a virtual role when encountering a non-flat ground provided by an embodiment.

FIG. 20 shows a sagittal perspective of the virtual role standing in a lean pose. Starting from point O of a ground position where the torso of the virtual role is located, a connection is made to a position F where the feet are located to obtain a plane where $\overrightarrow{OF}$ is located, and then, a perpendicular line is led from a stance point H of the torso to intersect with the plane to obtain an intersection point N. $\overrightarrow{ON}$ is a stance vector of this leg relative to the torso.

The same computation is performed on each leg of the virtual role, and the obtained stance vectors of all legs are grouped into front, rear, left and right. The pose angle Pitch of the torso is computed according to the stance vectors of all front legs and all rear legs, and the pose angle Roll of the torso is computed according to the stance vectors of all left legs and right legs.

Figure 21:
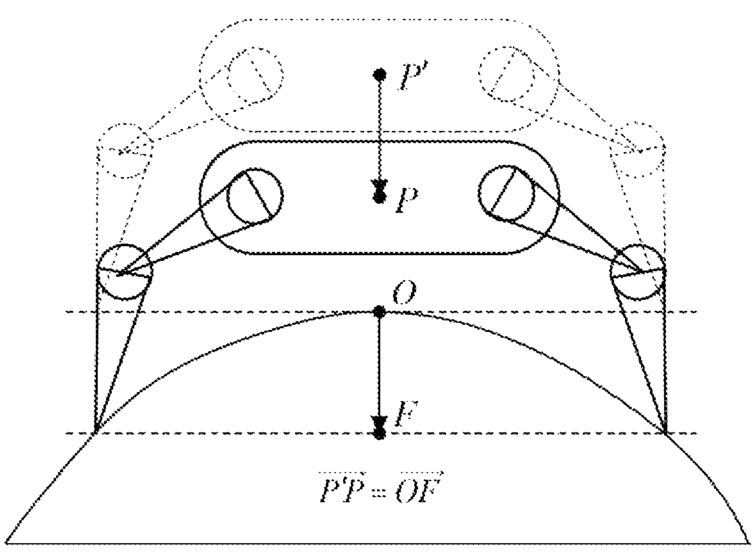
FIG. 21 shows an adjustment diagram of the body of a virtual role when encountering a protruding ground provided by an embodiment.

In some embodiments, this convex terrain shown in FIG. 21 may appear. When the virtual role stands on top, in order to maintain their feet on the ground, a posture of body arching up will be formed, as if being pushed up by something invisible. Therefore, it is also necessary to correct the height of the torso, and acquire a height difference between each foot F and the body position O of the virtual role in the current state and average the height difference, a correction value of the height of the torso can be obtained, and then this value is applied to the body bones of the virtual role to correct the torso to a reasonable height, for example raising the height difference $\overrightarrow{OF}$. That is, an average height difference between the touchdown point of each leg of the virtual role and the vertex of the convex ground is computed in response to that the virtual role is above the convex ground; raising compensation is performed on the height of the torso of the virtual role according to the average height difference. Thus, the height of the torso of the virtual role standing on convex terrain is more in line with the presentation of a robot in the real world. By adopting the above method, the problem of "slide" caused by animation blending has been fundamentally solved, the high-quality presentation of the pre-produced animation sequences are reserved to the greatest extent, and adaptation to the terrain and corresponding physical simulation can also be easily inserted in the process of program computation, which combines the advantages of the animation sequences and the program computation.

Figure 22:
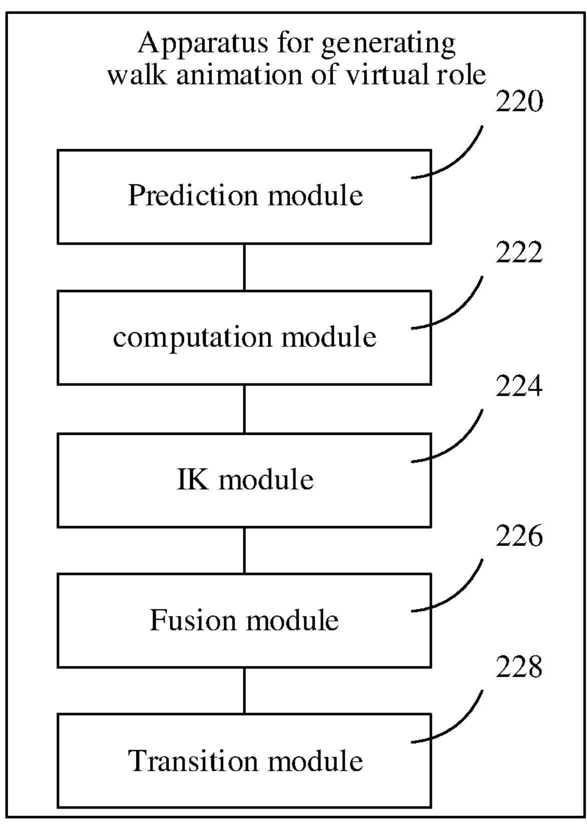
FIG. 22 shows a structural block diagram of an apparatus for generating a walk animation of a virtual role provided by an embodiment.

FIG. 22 shows a block diagram of an apparatus for generating a walk animation of a virtual role provided an exemplary embodiment of the present disclosure. The apparatus uses hardware or a combination of software and hardware to be applied in the terminal, and each leg of the virtual role alternately performs the swing phase and the stance phase in the walk process. The apparatus includes:

A prediction module 220, configured to predict touchdown points of each leg of the virtual role in the walk process according to the movement velocity and the movement direction of the virtual role;

A computation module 222, configured to compute the position of the foot of each leg in the swing phase according to two adjacent touchdown points of each leg;

An IK module 224, configured to perform, based on the position of the foot of each leg in the swing phase, inverse kinematics computation to obtain positions of bone points of each leg in the swing phase; and A fusion module 226, configured to perform, based on the positions of the bone points of each leg in the swing phase, gait fusion to generate the walk animation of the virtual role.

In one embodiment, the fusion module 226 is configured to acquire the pre-configured gait parameters; and perform, based on the gait parameters, gait fusion on the positions of the bone points of each leg in the swing phase to generate the walk animation of the virtual role.

In one embodiment, the gait parameters include: a gait period and leg parameters of each leg within the gait period. The fusion module 226 is configured to perform, within the gait period, gait fusion on the positions of the bone points of each leg in the swing phase according to the leg parameters of each leg within the gait period to generate the walk animation of the virtual role.

Where the leg parameters include at least one of a lift-up time point, the duration of the swing phase and the pace midpoint of the stance phase.

In one embodiment, the gait parameters include a first gait parameter in a first motion pattern and a second gait parameter in a second motion pattern.

The apparatus further includes:

A transition module 228, configured to perform interpolation on the first gait parameter and the second gait parameter to obtain a first blended gait parameter; and perform, based on the first blended gait parameter, gait fusion on the positions of the bone points of each leg in the swing phase to generate a transition animation of each leg of the virtual role to switch from the first motion pattern to the second motion pattern.

In one embodiment, the gait parameters include a third gait parameter in a first movement direction and a fourth gait parameter in a second movement direction.

The apparatus further includes:

A transition module 228, configured to perform interpolation on the third gait parameter and the fourth gait parameter to obtain a second blended gait parameter; and perform, based on the second blended gait parameter, gait fusion on the positions of the bone points of each leg in the swing phase to generate a walk animation of each leg of the virtual role in the third movement direction.

Where the third movement direction is a movement direction between the first movement direction and the second movement direction.

In one embodiment, the predicting the touchdown points of each leg of the virtual role according to the movement velocity and the movement direction of the virtual role includes:

predicting a predicted movement trajectory of the virtual role in a map according to the movement velocity and the movement direction of the virtual role; and sampling touchdown points of each leg on the predicted movement trajectory by taking a current pose of each leg of the virtual role as a predicted starting point.

In one embodiment, the virtual role includes n legs. The sampling the touchdown points of each leg on the predicted movement trajectory by taking the current pose of each leg of the virtual role as the predicted starting point includes:

Computing, in response to that a current pose of an $i^{th}$ leg of the virtual role is in a $t^{th}$ second state in the swing phase, the sum of the remaining duration of the swing phase and half of a duration of the stance phase as predicted duration;

Determining a position of moving forward for a predicted length along the predicted movement trajectory as a body position of the virtual role at the time of touchdown by taking the position of the current pose of the virtual role on the predicted movement trajectory as a starting point, where the predicted length is equal to a product of the predicted duration and the movement velocity; and Calculating, based on the body position of the virtual role at the time of touchdown and a relative position relationship, touchdown points of the $i^{th}$ leg of the virtual role on the predicted movement trajectory.

Where i is a positive integer not greater than n, and the relative position relationship is a pre-configured relative position between the body and the $i^{th}$ leg of the virtual role.

In one embodiment, the computation module 222 is configured to determine, based on positions of two adjacent touchdown points, a leg swing curve, where the leg swing curve indicates a swing trajectory of the foot in the swing phase; and perform, based on the leg swing curve, interpolation computation on the foot of each leg to determine the position of the foot of each leg in the swing phase.

In one embodiment, the IK module 224 is configured to perform CCDIK computation according to the two adjacent touchdown points of each leg to obtain the positions of the bone points of each leg in the swing phase; or, perform FABRIK computation according to the two adjacent touchdown points of each leg to obtain the positions of the bone points of each leg in the swing phase.

In one embodiment, the fusion module 226 is configured to acquire a torso animation of the virtual role; fuse the torso animation of the virtual role with the walk animation of each leg to obtain a bodily movement animation of the virtual role.

In one embodiment, the fusion module 226 is configured to scale the torso animation of the virtual role according to the gait period to obtain a scaled torso animation; and fuse the scaled torso animation of the virtual role with the walk animation of each leg to obtain the bodily movement animation of the virtual role.

In one embodiment, the computation module 222 is further configured to determine, in response to that there are elastic components on the body of the virtual role, at least two levels of bone nodes corresponding to the elastic components in the bone tree of the virtual role; and perform vibration computation of a three-dimensional vibration model starting from a root node of the at least two levels of bone nodes by taking a previous-level bone node as an origin and a next-level bone node as a vibrator, and determine a bone update position of the next-level bone node, until a bone update position of the elastic component is updated.

In one embodiment, the prediction module 220 is further configured to compute, in response to that the ground where the touchdown point is a non-flat ground, a first projection point of the touchdown point on the non-flat ground in the vertical direction; extract, based on a leg swing distance, a reference point, from a line between the touchdown point and the first projection point; and use a second projection point of the reference point on the non-flat ground in the vertical direction as an updated touchdown point.

In one embodiment, the prediction module 220 is further configured to deflect the pose of the foot at the time of touchdown according to the normal direction of the ground where the updated touchdown point is located.

In one embodiment, the fusion module 226 is further configured to compute a stance vector of each leg of the virtual role, where the stance vector indicates the inclination of the touchdown point of a current leg relative to the torso of the virtual role; compute, based on the stance vector of each leg, a pose angle of the torso of the virtual role; and perform, based on the pose angle, lean compensation on the torso of the virtual role.

In one embodiment, the fusion module 226 is further configured to compute, in response to that the virtual role is above the convex ground, an average height difference between the touchdown point of each leg of the virtual role and the vertex of the convex ground; and perform raising compensation on the height of the torso of the virtual role according to the average height difference.

Figure 23:
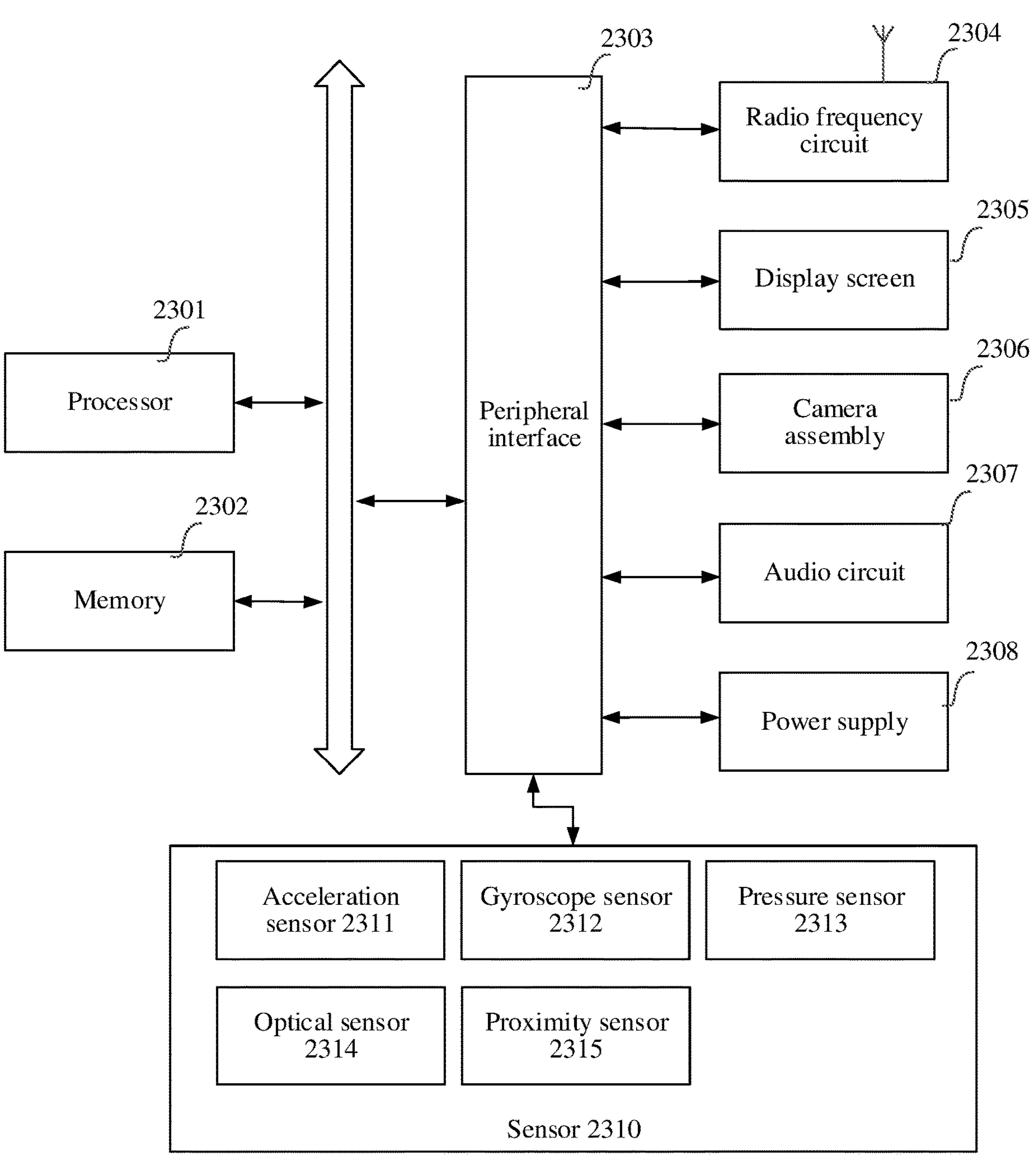
FIG. 23 shows a structural block diagram of a computer device provided by an embodiment.

FIG. 23 shows a structural block diagram of a computer device 2300 provided by an exemplary embodiment of the present disclosure. The computer device 2300 may be a portable mobile terminal, such as: a smartphone, a tablet computer, a moving picture experts group audio layer III (MP3) player, a moving picture experts group audio layer IV (MP4) player, a notebook computer or a desktop computer. The computer device 2300 may also be referred to as other names such as user equipment, a portable terminal, a laptop terminal or a desktop terminal.

Typically, the computer device 2300 includes: a processor 2301 and a memory 2302.

The processor 2301 may include one or more processing cores, such as a 4-core processor or an 8-core processor. The processor 2301 may be implemented in at least one hardware form of a digital signal processor (DSP), a field-programmable gate array (FPGA) and a programmable logic array (PLA). The processor 2301 may also include a main processor and a coprocessor. The main processor is a processor configured to process data in an awake state, and is also referred to as a central processing unit (CPU). The coprocessor is a low power consumption processor configured to process the data in a standby state. In some embodiments, the processor 2301 may be integrated with a graphics processing unit (GPU). The GPU is configured to be responsible for rendering and plotting content that needs to be displayed in a display screen. In some embodiments, the processor 2301 may further include an artificial intelligence (AI) processor. The AI processor is configured to process computing operations related to machine learning.

The memory 2302 may include one or more computer-readable storage media. The computer-readable storage medium may be non-transient. The memory 2302 may further include a high-speed random access memory and a nonvolatile memory, for example, one or more disk storage devices or flash storage devices. In some embodiments, the non-transitory computer-readable storage medium in the memory 2302 is configured to store at least one instruction, and the at least one instruction is used for being executed by the processor 2301 to implement an acceleration method for an out-of-domain network resource provided by the method embodiments in the present disclosure.

In some embodiments, the computer device 2300 may further includes a peripheral device interface 2303 and at least one peripheral device. The processor 2301, the memory 2302 and the peripheral device interface 2303 may be connected by a bus or a signal cable. Each peripheral device may be connected with the peripheral device interface 2303 by a bus, a signal cable, or a circuit board. Exemplarily, the peripheral device may include: at least one of a radio frequency circuit 2304, a display screen 2305, a camera component 2306, an audio circuit 2307 and a power supply 2308.

In some embodiments, the computer device 2300 further includes one or more sensors 2310. The one or more sensors 2310 include but are not limited to: an acceleration sensor 2311, a gyroscope sensor 2312, a pressure sensor 2313, an optical sensor 2314 and a proximity sensor 2315.

A person skilled in the art may understand that the structure shown in FIG. 23 does not constitute a limitation on the computer device 2300, and may include more or fewer components than shown, or combine certain components, or use different component arrangements.

The present disclosure further provides a computer-readable storage medium. The storage medium stores at least one instruction, at least one segment of program, a code set or an instruction set therein, and the at least one instruction, the at least one segment of program, the code set or the instruction set are loaded and executed by a processor to implement the method for generating the walk animation of the virtual role provided by the method embodiments.

The present disclosure provides a computer program product or computer program. The computer program product or computer program includes a computer-readable instruction. The computer-readable instruction is stored in the computer-readable storage medium. The processor of the computer device reads the computer-readable instruction from the computer-readable storage medium, and the processor executes the computer-readable instruction, such that the computer device performs the method for generating the walk animation of the virtual role provided by the method embodiments.

The serial number of the forgoing embodiments of the present disclosure is only for description and does not represent the advantages and disadvantages of the embodiments.

A person of ordinary skill in the art may understand that all or some of the steps of the foregoing embodiments may be implemented by hardware, or may be implemented by a program instructing relevant hardware. The program may be stored in a computer-readable storage medium. The storage medium may be a read-only memory, a magnetic disk, an optical disc, or the like.

The foregoing descriptions are merely example embodiments of the present disclosure, but are not intended to limit the present disclosure. Any modification, equivalent replacement, or improvement made within the spirit and principle of the present disclosure shall fall within the protection scope of the present disclosure.

What is claimed is:

1. A method for generating a walk animation of a virtual role comprising n legs, the method being performed by a computer device, a walk process of a leg of the virtual role including alternating swing phases and stance phases, and the method comprising:

predicting a predicted movement trajectory of the virtual role in the walk process according to a movement velocity and a movement direction of the virtual role in a virtual environment;

sampling multiple touchdown points of a leg on the predicted movement trajectory by taking a current pose of the leg of the virtual role as a predicted starting point, comprising:

computing, in response to that a current pose of an $i^{th}$ leg of the virtual role is in a $t^{th}$ second state in a swing phase, a predicted duration based on a remaining duration of the swing phase and a duration of a stance phase;

determining a position of moving forward for a predicted length along the predicted movement trajectory as a body position of the virtual role at a time of touchdown by taking a position of the current pose of the virtual role on the predicted movement trajectory as a starting point, the predicted length being calculated based on the predicted duration and the movement velocity;

calculating, based on the body position of the virtual role at the time of touchdown and a relative position relationship between a body and the $i^{th}$ leg of the virtual role, touchdown points of the $i^{th}$ leg of the virtual role on the predicted movement trajectory, wherein i is a positive integer not greater than n, and a previous touchdown point of two adjacent touchdown points is a lift-up point of a next touchdown point of the two adjacent touchdown points;

after the multiple touchdown points are determined, computing positions of a foot of the leg in a swing phase according to the two adjacent touchdown points of the leg;

performing, based on the positions of the foot of the leg in the swing phase, inverse kinematics computation to obtain positions of bone points of the leg in the swing phase; and performing, based on the positions of the bone points of the leg in the swing phase, gait fusion to generate a walk animation of the virtual role.

2. The method according to claim 1, wherein the performing, based on the positions of the bone points of the leg in the swing phase, gait fusion to generate the walk animation of the virtual role comprises:

acquiring pre-configured gait parameters; and performing, based on the gait parameters, gait fusion on the positions of the bone points of the leg in the swing phase to generate the walk animation of the virtual role.

3. The method according to claim 2, wherein the gait parameters comprise: a gait period and leg parameters of the leg within the gait period;

the performing, based on the gait parameters, gait fusion on the positions of the bone points of the leg in the swing phase to generate the walk animation of the virtual role comprises:

performing, within the gait period, gait fusion on the positions of the bone points of the leg in the swing phase according to the leg parameters of the leg within the gait period to generate the walk animation of the virtual role;

wherein the gait period is an alternating period between the swing phase and a stance phase, and the leg parameters comprise at least one of a lift time point, a duration of the swing phase and a pace midpoint of the stance phase.

4. The method according to claim 3, wherein the gait parameters comprise a first gait parameter in a first motion pattern and a second gait parameter in a second motion pattern;

the method further comprises:

performing interpolation on the first gait parameter and the second gait parameter to obtain a first blended gait parameter; and performing, based on the first blended gait parameter, gait fusion on the positions of the bone points of the leg in the swing phase to generate a transition animation of the leg of the virtual role to switch from the first motion pattern to the second motion pattern.

5. The method according to claim 3, wherein the gait parameters comprise a third gait parameter in a first movement direction and a fourth gait parameter in a second movement direction;

the method further comprises:

performing interpolation on the third gait parameter and the fourth gait parameter to obtain a second blended gait parameter; and performing, based on the second blended gait parameter, gait fusion on the positions of the bone points of the leg in the swing phase to generate a walk animation of the leg of the virtual role in the third movement direction;

wherein the third movement direction is a movement direction between the first movement direction and the second movement direction.

6. The method according to claim 1, wherein the predicted duration is a sum of the remaining duration of the swing phase and half of the duration of the stance phase.

7. The method according to claim 1, further comprising:

Computing, in response to a ground where a touchdown point of the multiple touchdown points is located being a non-flat ground, a first projection point of the touchdown point on the non-flat ground in a vertical direction;

extracting, based on a leg swing distance, a reference point, from a line between the touchdown point and the first projection point; and using a second projection point of the reference point on the non-flat ground in the vertical direction as an updated touchdown point.

8. The method according to claim 7, further comprising:

deflecting a pose of the foot at the time of touchdown according to the normal direction of the ground where the updated touchdown point is located.

9. The method according to claim 7, comprising:

determining a spline curve, in response to that an obstacle exists below a body of the virtual role, based on positions of the two adjacent touchdown points and the highest point of the obstacle; and superposing the spline curve with the leg swing curve to obtain an updated leg swing curve.

10. The method according to claim 1, wherein the computing the positions of the foot of the leg in the swing phase according to the two adjacent touchdown points of the leg comprises:

determining, based on positions of the two adjacent touchdown points, a leg swing curve, the leg swing curve indicating a swing trajectory of the foot in the swing phase; and performing, based on the leg swing curve, interpolation computation on the foot of the leg to determine the positions of the foot of the leg in the swing phase.

11. The method according to claim 1, wherein the performing, based on the positions of the foot of the leg in the swing phase, inverse kinematics computation to obtain positions of bone points of the leg in the swing phase comprises:

performing a cyclic coordinate descent inverse kinematics (CCDIK) computation according to the two adjacent touchdown points of the leg to obtain the positions of the bone points of the leg in the swing phase;

or performing a forward and backward reaching inverse kinematics (FABRIK) computation according to the two adjacent touchdown points of the leg to obtain the positions of the bone points of the leg in the swing phase.

12. The method according to claim 1, further comprising:

acquiring a torso animation of the virtual role, the torso animation is an animation of a body of the virtual role in the walk process; and fusing the torso animation of the virtual role with the walk animation of the virtual role to obtain a bodily movement animation of the virtual role.

13. The method according to claim 12, wherein the fusing the torso animation of the virtual role with the walk animation of the virtual role to obtain the bodily movement animation of the virtual role comprises:

scaling a duration of the torso animation of the virtual role according to a duration of a gait period to obtain a scaled torso animation; the gait period being an overall period of one swing phase and one alternating stance phase; and fusing the scaled torso animation with the walk animation of the virtual role to obtain the bodily movement animation of the virtual role.

14. The method according to claim 1, further comprising:

determining, in response to that a body of the virtual role comprise elastic components, at least two levels of bone nodes corresponding to the elastic components in a bone tree of the virtual role; and performing vibration computation of a three-dimensional vibration model starting from a root node of the at least two levels of bone nodes by taking a previous-level bone node as an origin and a next-level bone node as a vibrator, and determine a bone update position of the next-level bone node, until a bone update position of the elastic component is updated.

15. The method according to claim 1, further comprising:

computing a stance vector of the leg of the virtual role, the stance vector indicating an inclination of a touchdown point of a current leg relative to a torso of the virtual role;

computing, based on the stance vector of the leg, a pose angle of the torso of the virtual role; and performing, based on the pose angle, lean compensation on the torso of the virtual role.

16. The method according to claim 1, further comprising:

computing, in response to that the virtual role is above a convex ground, an average height difference between the touchdown point of the leg of the virtual role and a vertex of the convex ground; and performing raising compensation on a height of a torso of the virtual role according to the average height difference.

17. The method according to claim 1, wherein the movement direction of the virtual role is controlled in response to a user operation in a virtual game.

18. An apparatus for generating a walk animation of a virtual role comprising n legs, a walk process of a leg of the virtual role including alternating swing phases and stance phases, and the apparatus comprising:

predicting a predicted movement trajectory of the virtual role in the walk process according to a movement velocity and a movement direction of the virtual role in a virtual environment;

sampling multiple touchdown points of a leg on the predicted movement trajectory by taking a current pose of the leg of the virtual role as a predicted starting point, comprising:

computing, in response to that a current pose of an $i^{th}$ leg of the virtual role is in a $t^{th}$ second state in a swing phase, a predicted duration based on a remaining duration of the swing phase and a duration of a stance phase;

determining a position of moving forward for a predicted length along the predicted movement trajectory as a body position of the virtual role at a time of touchdown by taking a position of the current pose of the virtual role on the predicted movement trajectory as a starting point, the predicted length being calculated based on the predicted duration and the movement velocity; and calculating, based on the body position of the virtual role at the time of touchdown and a relative position relationship between a body and the $i^{th}$ leg of the virtual role, touchdown points of the $i^{th}$ leg of the virtual role on the predicted movement trajectory, wherein i is a positive integer not greater than n, and a previous touchdown point of two adjacent touchdown points is a lift-up point of a next touchdown point of the two adjacent touchdown points;

after the multiple touchdown points are determined, computing positions of a foot of the leg in a swing phase according to the two adjacent touchdown points of the leg;

performing, based on the position of the foot of the leg in the swing phase, inverse kinematics computation to obtain positions of bone points of the leg in the swing phase; and performing, based on the positions of the bone points of the leg in the swing phase, gait fusion to generate a walk animation of the virtual role.

19. A non-transitory computer-readable storage medium, storing a computer-readable instruction, and the computer-readable instruction being loaded and executed by one or more processors to implement:

predicting a predicted movement trajectory of a virtual role in a walk process according to a movement velocity and a movement direction of the virtual role in a virtual environment, the walk process of a leg of the virtual role including alternating swing phases and stance phases, and the virtual role comprising n legs;

sampling multiple touchdown points of a leg on the predicted movement trajectory by taking a current pose of the leg of the virtual role as a predicted starting point, comprising:

computing, in response to that a current pose of an $i^{th}$ leg of the virtual role is in a $t^{th}$ second state in a swing phase, a predicted duration based on a remaining duration of the swing phase and a duration of a stance phase;

determining a position of moving forward for a predicted length along the predicted movement trajectory as a body position of the virtual role at a time of touchdown by taking a position of the current pose of the virtual role on the predicted movement trajectory as a starting point, the predicted length being calculated based on the predicted duration and the movement velocity; and calculating, based on the body position of the virtual role at the time of touchdown and a relative position relationship between a body and the $i^{th}$ leg of the virtual role, touchdown points of the $i^{th}$ leg of the virtual role on the predicted movement trajectory, wherein i is a positive integer not greater than n, and a previous touchdown point of two adjacent touchdown points is a lift-up point of a next touchdown point of the two adjacent touchdown points;

after the multiple touchdown points are determined, computing positions of a foot of the leg in a swing phase according to the two adjacent touchdown points of the leg;

performing, based on the positions of the foot of the leg in the swing phase, inverse kinematics computation to obtain positions of bone points of the leg in the swing phase; and performing, based on the positions of the bone points of the leg in the swing phase, gait fusion to generate a walk animation of the virtual role.

* * * * *